United States Patent
Meschenmoser et al.

(10) Patent No.: US 11,747,654 B2
(45) Date of Patent: Sep. 5, 2023

(54) COMPUTER-IMPLEMENTED METHOD FOR GENERATING DATA IN ORDER TO PRODUCE AT LEAST ONE SPECTACLE LENS, AND METHOD FOR PRODUCING A PAIR OF SPECTACLES

(71) Applicant: Carl Zeiss Vision International GmbH, Aalen (DE)

(72) Inventors: Ralf Meschenmoser, Essingen (DE); Friedrich Pauker, Diedorf (DE); Gerhard Kelch, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/156,220

(22) Filed: Jan. 18, 2023

(65) Prior Publication Data

US 2023/0152607 A1    May 18, 2023

Related U.S. Application Data

(63) Continuation of application No. PCT/EP2021/070553, filed on Jul. 22, 2021.

(30) Foreign Application Priority Data

Jul. 23, 2020 (EP) ..................................... 20187511

(51) Int. Cl.
G02C 13/00    (2006.01)
G02C 7/02    (2006.01)

(52) U.S. Cl.
CPC ........... *G02C 13/005* (2013.01); *G02C 7/024* (2013.01)

(58) Field of Classification Search
CPC .............................. G02C 7/024; G02C 13/005
(Continued)

(56) References Cited

U.S. PATENT DOCUMENTS 5,444,503 A    8/1995    Kelch et al.
6,089,713 A    7/2000    Hof et al.
(Continued)

FOREIGN PATENT DOCUMENTS

DE    102007020031 A1    10/2008
DE    102008012268 A1    9/2009
(Continued)

OTHER PUBLICATIONS

ImpressionIST—The 4-in-1 lintegrated Service-Terminal by Rodenstock, Deutsche Optiker Zeitung, pp. 56 to 61, Jan. 2006, and English-language machine translation thereof.
(Continued)

*Primary Examiner* — James R Greece
(74) *Attorney, Agent, or Firm* — Tautz & Schuhmacher LLC; Georg M. Hasselmann

(57) ABSTRACT

A computer-implemented method for generating data to produce a spectacle lens adapted to a spectacle frame is disclosed. The method includes: (i) providing, on a storage medium, a first data set containing a centering value and a three-dimensional model of the spectacle frame; (ii) creating, using the first data set, a second data set containing a geometric value of a surface of the spectacle lens; (iii) creating, in order to produce the spectacle lens from a spectacle lens blank and to grind in and/or fit the at least one spectacle lens into the spectacle frame using the first and second data sets, a third data set stored on the storage medium, wherein the data values of each data set have a spatial relationship with respect to each other such that the data values of each data set are consistently specified in relation to a particular coordinate system.

20 Claims, 7 Drawing Sheets

(58) Field of Classification Search
USPC .................................................. 351/159.74
See application file for complete search history.

(56) References Cited

U.S. PATENT DOCUMENTS

| | | | |
|---|---|---|---|
| 6,655,802 | B2 | 12/2003 | Nikolaus et al. |
| 7,384,144 | B2 | 6/2008 | Ross-Messemer et al. |
| 9,971,172 | B2 | 5/2018 | Cabeza-Guillen et al. |
| 11,243,139 | B2 | 2/2022 | Meschenmoser et al. |
| 11,448,903 | B2 | 9/2022 | Gamperling et al. |
| 2010/0128220 | A1 | 5/2010 | Chauveau |
| 2014/0253875 | A1 | 9/2014 | Le Gallou et al. |
| 2017/0205903 | A1* | 7/2017 | Miller ..................... G06T 7/174 |
| 2020/0211218 | A1* | 7/2020 | Le Gallou ................. G06T 7/73 |
| 2020/0233239 | A1 | 7/2020 | Schwarz et al. |

FOREIGN PATENT DOCUMENTS

| | | | |
|---|---|---|---|
| DE | 102016004430 | A1 | 10/2017 |
| DE | 102016113374 | B3 | 10/2017 |
| EP | 562336 | A1 | 9/1993 |
| EP | 857993 | B2 | 10/2006 |
| EP | 3422087 | A1 | 1/2019 |
| EP | 3425446 | A1 | 1/2019 |
| WO | 0184215 | A1 | 11/2001 |
| WO | 0188654 | A2 | 11/2001 |
| WO | 2005069063 | A1 | 7/2005 |
| WO | 2017205903 | A1 | 12/2017 |
| WO | 2020127758 | A2 | 6/2020 |

OTHER PUBLICATIONS

Industrial Norm "Ophthalmic optics—Spectacle lenses—Vocabulary (ISO 13666:2019)," EN ISO 13666:2019, Dec. 2019, in English.

Extended European Search Report issued in 20 187 511.9, to which this application claims priority, dated Jan. 22, 2021, and English-language machine translation thereof.

International Search Report issued in PCT/EP2021/070553, to which this application claims priority, dated Oct. 25, 2021, and English-language translation thereof.

Written Opinion issued in PCT/EP2021/070553, to which this application claims priority, dated Oct. 25, 2021.

International Preliminary Examination Report issued in PCT/EP2021/070553, to which this application claims priority, completed Sep. 28, 2022, and English-language translation thereof.

* cited by examiner

COMPUTER-IMPLEMENTED METHOD FOR GENERATING DATA IN ORDER TO PRODUCE AT LEAST ONE SPECTACLE LENS, AND METHOD FOR PRODUCING A PAIR OF SPECTACLES

CROSS REFERENCE TO RELATED APPLICATIONS

This application is a continuation application of international patent application PCT/EP2021/070553, filed on Jul. 22, 2021, designating the United States and claiming priority to European patent application EP 20 187 511.9, filed on Jul. 23, 2020, both of which are hereby incorporated by reference in their entireties.

TECHNICAL FIELD

The present disclosure relates to a computer-implemented method for generating data for the production of at least one spectacle lens adapted to a spectacle frame of a pair of spectacles, a computer program for carrying out the computer-implemented method, a method for producing a pair of spectacles using the data generated in the computer-implemented method, and a system for producing at least one spectacle lens adapted to a spectacle frame of a pair of spectacles.

BACKGROUND

The standard DIN EN ISO 13666:2019-12 defines basic terms of ophthalmic optics, in particular terms for semi-finished spectacle lens products, which are also referred to as "spectacle lens blanks," refers to finished spectacle lenses, in particular to a multiplicity of parameters which relate to the finished spectacle lenses or to a spectacle frame selected by a user of the spectacles for at least fitting the spectacle lenses, and establishes methods for adapting the spectacle lenses to the user of the spectacles and to the spectacle frame selected by the user. In the present disclosure, references to the standard are in each case to be understood as references to DIN EN ISO 13666:2019-12.

Using the standard, the spectacle lenses are adapted to the spectacle frame selected by the user, usually during a visit by the user to an optician, according to the following sequence with the method steps given below:

"determining the correction": carrying out subjective refraction to determine a necessary correction of refractive errors of the eyes of the user of the pair of spectacles, wherein use is made of already known values recorded by measuring, for example from an ophthalmic prescription for the user, and/or wherein an objective refraction of both eyes of the user can be ascertained by carrying out a refraction determination using a known refractometer;

"selecting a spectacle frame": selecting at least one spectacle frame by the user;

"determining centering data": creating a centering record with the spectacle frame put on by the user, while the user adopts the habitual head and body posture and a fixed line of sight through dummy lenses fitted into the spectacle frame, with a lens type for the spectacle lenses already being implicitly established, and thus implicitly an associated centering specification for adapting the spectacle lenses to the spectacle frame; and "lens selection": selecting a lens by the user and optician, the "lens selection" establishing properties of the lens, in particular the lens type, a refractive index, a tint and at least one optional coating of a spectacle lens, the lens type being used in the determination of the centering specification.

According to the present standard, the centering data are specified in relation to a spectacle frame coordinate system and/or a lens coordinate system. However, these are generally not aligned exactly parallel and/or perpendicular in space. Therefore, a lateral tilt of the head can lead to an axis position of a spectacle lens in the worn position deviating from the axis position ascertained in relation to the head of the user when carrying out a refraction determination. In this case, the head of the user is generally forced into a neutral position, which is oriented with respect to the vertical of the refractometer used. Moreover, the optician uses the horizontal of the spectacle frame as orientation during remote edging of the spectacle lenses.

The same happens if the optician generally displaces a marking on the respective spectacle lens in a vertical direction at the end of the centering process, which also implicitly changes the direction of the view through the spectacle lens. However, this displacement is not communicated to the producer of the spectacle lens; instead, the calculation of the spectacle lens and the production of the spectacle lenses based thereon is implemented for a line of sight that deviates from the assumed, habitual wearing position.

Comparable problems may arise in the case of a virtual centering. Here, the optician initially creates a virtual model of a section of the user, in particular of the head of the user, which is also referred to as an "avatar," to be precise under the same conditions as when creating the centering record. However, the avatar is created without the user wearing a pair of spectacles at the time of the avatar's creation, in particular so as to make the selection of the spectacle frame independent from the time and place of the visit to the optician by the user. Thus, by means of an Internet-based application, the user can use the avatar to put spectacle frames available as a spatial digitized model on the avatar, for example from home, and make a selection. However, since the user may not be wearing spectacles at the time the avatar is created, it is not possible to determine centering data. The lens selection can likewise only be made after the selection of the spectacle frame, especially due to the lack of data at this time in relation to the material and design of the spectacle lenses. The centering data can only be determined thereafter, either as so-called "virtual centering" based on a spatial model of the spectacle frame placed on the avatar or as so-called "real centering" on location at the optician following the production and provision of the spectacle frame on the basis of the spatial model of the spectacle frame. Further problems may arise here if the optician has only some of the usable models for spectacle frames physically available, and therefore the centering data cannot be ascertained completely. A disadvantage of both configurations is that the centering data must be determined before the spectacle lenses are made available.

WO 2005/04215 A1 discloses a device for ascertaining centering data for a pair of spectacles, comprising a computer-drivable recording unit, which records electronic images and is arranged behind a splitter element, and comprising a fixation device. The fixation device generates at least one speckle pattern. The structural properties of the fixation device ensure that the subject's gaze is oriented in a predetermined direction. The speckles can be superposed with different patterns, e.g., a cross-shaped pattern. The disclosure also relates to a method for ascertaining centering data. The method and device according to the disclosure allow the relative centering data in a habitual posture to be measured from a short distance for test subjects with greatly differing visual acuity.

DE 10 2008 012 268 A1 discloses a device and a method for the three-dimensional presentation of representation image data, in particular for positioning a subject, comprising at least one image recording device designed to generate image data of at least a portion of a head of a subject, at least one image representation device designed to present representation image data three-dimensionally in such a way that a fixation target is presented three-dimensionally and/or a portion of the head of the subject is illuminated and/or information data are presented three-dimensionally, and at least one data machining device designed to determine parameter data of the subject by means of the image data.

DE 10 2016 004 430 A1 discloses a method for determining optical parameters of a subject and a computer program product for carrying out the method. The method comprises the steps of: generating image data of at least portions of a system of the head of the subject and a spectacle frame arranged thereon in the position of use; and iteratively determining the optical parameters by evaluating the image data generated, wherein the evaluation of the image data generated comprises computer-assisted automatic image machining of the image data and execution of a number of a multiplicity of predetermined manual image selection steps, where the number can be set by a user of the video centering system, and wherein the number of iteration steps executed in the iterative determination of the optical parameters depends on the number of manual image selection steps executed by the user.

DE 10 2016 113 374 B3 discloses a method for determining a far visual point on a spectacle lens which can be received in a spectacle frame that has a frame plane, in which an image, lying in an image plane, of at least one section of a spectacle frame worn by a subject is captured by a camera having an optical axis while the subject is looking into the camera with a line of sight of at least one eye that passes through the frame plane, in which a pantoscopic angle of the spectacle frame related to the position of the image plane is ascertained, said angle is corrected to form a pantoscopic angle related to the vertical direction in accordance with the captured tilt angle of the image plane in relation to the vertical direction, in which a head rotation angle of the head of the subject, formed by the optical axis of the camera with a plane perpendicular to the distance line between the pupils of the eyes of the subject, is ascertained, in which the head rotation angle is corrected to a corrected head rotation angle corresponding to a horizontal alignment of the optical axis of the camera in accordance with the captured tilt angle of the image plane in relation to the vertical direction, in which the far visual point is determined by analyzing the image lying in the image plane while taking into account the corrected head rotation angle that corresponds to a horizontal alignment of the optical axis of the camera and in which the point of intersection of the line of sight with the frame plane is determined by means of an image evaluation.

EP 3 422 087 A1 discloses methods and devices for correcting centering parameters and/or an axis position of a spherocylindrical refraction on the basis of a habitual head posture. A representation of the head is shown on a display, whereby intuitive setting of a habitual head posture is possible.

EP 3 425 446 A1 discloses a method for virtual adaptation of a pair of spectacles, and a corresponding computer program and a computing device. Here, first measurement points are defined on a 3D model of a head of a person, and a model of a spectacle frame is adapted on the basis of the first measurement points. According to the disclosure, defining the first measurement points comprises defining second measurement points on a parametric head model, adapting the parametric head model to the 3D model of the head of the person and determining the first measurement points on the basis of the second measurement points and the adaptation. In this way, the second measurement points only need to be defined once on the parametric head model in order to be able to define the first measurement points for a multiplicity of different 3D models of different heads.

US 2010/0128220 A1 discloses a method and a device for measuring the position of remarkable points in the eye of a user. Here, the method comprises a method step for recording images in different relative positions of the user in order thereby to ascertain reference points of the eye and determine the remarkable point as a function of the images. The values of the posture parameters are obtained by means of a position-determining element, which has at least one known geometric manifestation, which is attached to the head of the user. Each of the recorded images comprises a representation of the position-determining element. The posture parameter is ascertained as a function of the recorded images and the known geometric manifestation.

US 2014/253875 A1 discloses a method for determining ocular and optical measurements for producing and adapting corrective spectacle lenses for a user by means of a camera. The method uses a protocol for reconstructing the eye system in three dimensions by modeling the eye system to provide accurate ocular and optical measurements. The method uses test objects which are connected or not connected to the face of the user.

EP 0 562 336 A1 discloses a spectacle lens with a multifocal surface and a prescription surface, which is distinguished by the fact that the prescription surface is a general aspheric surface without point and axis symmetry. When determining the geometry of the prescription surface, at least the dioptric effect over the area is taken into account from the individual conditions of use. The prescription surface serves exclusively to generate the dioptric power at the reference points and also to eliminate increases in image errors.

EP 0 857 993 B2 discloses a method for producing spectacle lenses with a progressive surface, the spectacle lens being produced from semi-finished products with spherical or aspherically rotationally symmetrical convex front surfaces with few different radii in such a way that the entire individually required dioptric power adjustment takes place with the back surface of the spectacle lens formed as a progressive surface without point and axial symmetry, with at least one individual optimization of the shape of the back surface for the later user being performed, starting from a previously determined starting surface, and used as a boundary condition for the optimization of the corneal vertex distance and/or the different size perception of the two eyes and/or the forward tilt of the frame and/or the frame shape and/or the centering and/or the interpupillary distance and/or special usage situations.

WO 2001/084215 A1 discloses a method for producing a pair of spectacles that have individual progressive lenses, with the following steps:
  selection of a spectacle frame;
  determination of the shape of the lens rings with an accuracy in x- and y-direction of higher than ±0.5 mm (data set 1);

determination of the pass points of the lines of sight through the plane of the lens rings for at least two design distances of the progressive lenses with an accuracy of higher than ±1 mm (data set 2);

selection and positioning in relation to the lens rings of a spherical or aspherical surface on the basis of prescription data and using data records 1 and 2 (data record 3);

calculation and positioning of the progressive surface relative to the selected surface to minimise the critical thickness of the spectacle lens and using data records 1 to 3 (data set 4);

fabrication of the progressive surfaces as well as the edging of the spectacle lenses from a one-sided ready semi-finished product without edging using data records 1 to 4.

WO 2001/88654 A2 discloses a spectacle adapting system comprising a wide-view imaging system, which provides a wide view of a customer's face, a 3D image processor, which generates initial 3D information describing the customer's physical features, a virtual fitting unit, which receives the digital 3D representation of the customer's face and a 3D digital representation of a spectacle frame to place the spectacle frame virtually on the customer's face and generate second 3D information describing the fit of the spectacle frame on the face, and a lens adapting device, which receives the first 3D information and the second 3D information and generates therefrom at least one parameter for customized production and cutting of the lens in relation to the spectacle frame and the face.

*ImpressionIST—The 4-in-1 integrated Service-Terminal by Rodenstock*, Deutsche Optiker Zeitung, 1-2006, pages 56-61, describes an advisory and 3D video centering system, in particular for individual spectacle lenses. With a three-dimensional measurement of the individual parameters and the customer's centering data, the system provides the basis for a performance of the individual spectacle lenses. Furthermore, the integrated service functions provide the optician with an advisory system with which he can demonstrate the advantages of individually optimized spectacle lenses to his customers, in particular by integrated lens and frame advice and a frame presentation for the customer.

US 2020/211218 A1 discloses a method for automatically determining at least one parameter associated with an ophthalmic device selected by a person, the device comprising a frame referred to as the selected frame, the determination being based on a captured image of the face of the person wearing the selected frame or a frame of a second ophthalmic device. The method comprises the following steps: detecting at least one characteristic point of at least one eye of the individual in the captured image and estimating the three-dimensional position of the at least one detected characteristic point; detecting the frame worn and estimating the three-dimensional position of the frame worn by aligning a three-dimensional representation of the frame worn with the frame worn in the captured image; and determining the at least one parameter from the relative position of the eyes in relation to the three-dimensional representation of the selected frame.

WO 2017/205903 A1 discloses an optical measuring system for fitting a pair of spectacles to a subject or for diagnosing or monitoring ocular diseases and/or disorder in the subject, and methods of use thereof. The system comprises at least one image capturing device for capturing at least one image of at least part of the subject's face. The system also comprises at least one movable mount for mounting the image capturing device in front of the subject and moving the image capturing device relative to the subject; and at least one processor operatively connected to the image capturing device to generate a three-dimensional (3D) model of the at least part of the subject's face. The at least one processor is also configured to determine at least optical measurement in relation to the subject from the 3D model generated.

Despite the advantages of the known methods for producing a pair of spectacles, they still have considerable potential for improvement. With the methods mentioned above, deviations, errors and/or tolerances can usually add up. This can result in the manufactured spectacles not meeting the user's requirements even though the spectacle lenses are set up to correctly correct the at least one refractive error of the user. In particular, the user can experience intolerance, as a result of which the user is reluctant to wear the custom-made spectacles and in particular complains to the optician about the custom-made spectacles.

SUMMARY

Against the background in particular of the standard DIN EN ISO 13666:2019-12, the object of the present disclosure is to provide a computer-implemented method for generating data for the production of at least one spectacle lens adapted to a spectacle frame of a pair of spectacles, a computer program for carrying out the computer-implemented method, a method for producing a pair of spectacles and a system for producing at least one spectacle lens adapted to a spectacle frame of a pair of spectacles which at least partially overcomes the listed disadvantages and limitations of the prior art.

This object is achieved by a computer-implemented method for generating data for the production of at least one spectacle lens adapted to a spectacle frame of a pair of spectacles, a computer program for carrying out the computer-implemented method, a method for producing a pair of spectacles and a system for producing at least one spectacle lens adapted to a spectacle frame of a pair of spectacles with the features of the independent claims. Typical configurations, which can be realized individually or in combination, are presented in the dependent claims.

Hereinafter the terms "have," "comprise" or "include" or any grammatical variations of these are used in a non-exclusive way. Accordingly, these terms can refer either to situations in which no further features are present apart from the feature introduced by these terms or to situations in which one or more further features are present. For example, the expression "A has B," "A comprises B" or "A includes B" can refer both to the situation in which no further element apart from B is provided in A (that is to say to a situation in which A consists exclusively of B) and to the situation in which, in addition to B, one or more further elements are provided in A, for example element C, elements C and D, or even further elements.

In a first aspect, the present disclosure relates to a computer-implemented method for generating data for the production of at least one spectacle lens adapted to a spectacle frame of a pair of spectacles. The term "spectacles" refers here to an element which comprises at least one spectacle lens, typically two individual spectacle lenses, and a spectacle frame, the at least one spectacle lens being intended for fitting into a spectacle frame which is selected by a user of the spectacles. Alternatively, the at least one spectacle lens may be used as a frameless spectacle lens. Instead of the term "user" used here, either of the terms "subject" or "spectacle wearer" can also be used synonymously.

A "spectacle lens" is understood as meaning an optical lens which, according to the standard, is intended to correct ametropia and/or to protect the eye or to change the appearance of a user, with the optical lens being worn in front of the eye of the user but not in contact with the eye. The optical lens used as a spectacle lens may comprise a front surface, a back surface and a so-called "edge" arranged between the front surface and the back surface, with the "front surface" denoting a surface of the spectacle lens facing away from the eye and the "back surface" denoting a surface of the spectacle lens on the eye side. Furthermore, a spectacle lens may be assigned to at least one "lens type," selected from a single-focal spectacle lens, a multi-focal spectacle lens, in particular a two-focal spectacle lens or a three-focal spectacle lens, a varifocal spectacle lens or a degressive spectacle lens. However, other lens types of spectacle lenses are conceivable. The spectacle lens may typically comprise an optically transparent material, in particular selected from glass or a transparent organic plastic, in each case with a different selectable refractive index.

The "spectacle frame" is set up to securely hold the at least one spectacle lens, typically the two individual spectacle lenses. For this purpose, the spectacle frame may have a frame, usually referred to as a "spectacle frame," which has a receptacle for the at least one spectacle lens, typically one of the two spectacle lenses, on the right and/or left side. Typically, the spectacle frame may comprise a transparent or non-transparent material, in particular a strong but flexible and light material. "Full-rim spectacles," which have a frame enclosing the at least one lens, typically the two lenses, can be distinguished from "half-rim spectacles," in which the at least one lens, typically the two lenses, only partially adjoin the frame, and from "frameless spectacles" in which the at least one lens, typically the two lenses, has/have a bore for receiving a holder for attachment to the spectacle frame. In addition, the spectacle frame may comprise further components, in particular at least one temple piece for wearing the spectacles on an ear and/or at least one pad on a nose of a user of the spectacles.

In the case of full-rim spectacles, each receptacle for the spectacle lenses is closed, and consequently may typically have a groove running around the inside of the spectacle frame. In this case, the spectacle frame thus has an "inner contour," which denotes a profile of a shape running around the inside of the spectacle frame. In this way, a spatial progression of at least part of the spectacle frame set up for holding the spectacle lenses can be specified by way of a so-called "frame edge curve." In the case of half-rim spectacles, the frame edge curve or edge curve in the front surface of the spectacle frame facing away from the eye is the same as the outer edge of the lens on the front side or the inner edge of the frame, insofar as there is a structure given by the frame. Insofar as there is no structure given by the frame in the case of half-rim spectacles, the edge curve in the front surface of the spectacle frame facing away from the eye is the same as the outer edge of the lens on the front side. In the case of frameless spectacles there is no analogous structure of the frame, i.e. the term "edge curve" always refers here in the front surface of the spectacle frame facing away from the eye to the outer edge of the lens on the front side. Consequently, the term "edge curve" may be used hereafter synonymously for the terms "lens outer edge" and "frame inner edge," depending on whether the term is used in connection with the spectacle lens or the frame.

The present computer-implemented method here comprises the following steps (i) to (iii), typically in the specified sequence. Another sequence is also possible in principle. Furthermore, an at least partially simultaneous execution of method steps, in particular of consecutive method steps, is possible. Furthermore, one or more or all of the steps of the method may be repeated, in particular executed more than once, for example iteratively. In addition to the method steps mentioned, the method may also comprise other method steps that are mentioned or not mentioned in this document. The method steps of the computer-implemented method are as follows:

(i) providing at least one first data set stored on a storage medium, the first data set comprising at least the following data values:
  at least one centering value;
  a three-dimensional model of the spectacle frame;
(ii) creating at least one second data set stored on a storage medium using the at least one first data set, the second data set comprising at least the following data values:
  at least one geometric value of at least one surface of the at least one spectacle lens;
(iii) creating at least one third data set stored on a storage medium for producing the at least one spectacle lens from at least one spectacle lens blank and for grinding and/or fitting the at least one spectacle lens into the spectacle frame using the at least one first data set and the at least one second data set, wherein the data values of each data set have a spatial relationship with one another in that the data values of each data set are consistently specified in relation to a respective coordinate system, with all data values of each data set being specified in a coordinate system common to all data sets or being transformed from the common coordinate system or into the common coordinate system.

In connection with the present disclosure, the term "data set" refers to a multiplicity of data values that may be based on measured values recorded by measuring and/or on existing data, in particular three-dimensional design data, and/or may be ascertained from such values, and which are thereby related in terms of content in that they relate to the user and/or the at least one spectacle lens and/or the spectacle frame. In this case, at least two data sets may also be combined to form a further data set or be present together. The data set takes a form in which it is stored digitally on a storage medium. Any computer-readable storage medium can be used as a "storage medium," regardless of where it is located and how it is accessible, as long as its capacity is sufficient for storing the data sets within the scope of the present disclosure. Each data value may have at least one numeric value or one alphanumeric value, each data value being specified in relation to a selected coordinate system, as explained in more detail below. It is pointed out that the ordinal numbers "first," "second" or "third" are only used for uniquely identifying the different data sets, with the ordinal numbers neither indicating a sequence nor a ranking.

According to the present disclosure, the data values of each data set have a spatial relationship with one another. The term "spatial relationship" generally denotes a relationship between at least two data values, each of which relates to at least one coordinate of a spatial position, the relationship being such that the spatial positions in relation to one another indicated by the at least two data values can be uniquely characterized by at least one distance and/or at least one angle. For example, at least one data value of a first data set may relate to a first spatial position that indicates at least one distance and/or at least one angle in relation to a spectacle frame, while at least one data value of a second data set may relate to a second spatial position that indicates at least one distance and/or at least one angle in relation to a spectacle lens. The at least one data value of the first data set and the at least one data value of the second data set then have a spatial relationship if at least one distance and/or at least one angle can be uniquely specified, characterizing a relative position of the first spatial position in relation to the spectacle frame and the second spatial position in relation to the spectacle lens to one another. Other examples that can be used in particular within the scope of the present disclosure, which relate for example to the spatial position in relation to a machining device, are conceivable.

According to the disclosure, the spatial relationship of the data values of each data set is achieved in that the data values of each data set are specified in relation to a respective coordinate system, with all data values of each data set being specified in a coordinate system common to all data sets or being transformed from the common coordinate system or into the common coordinate system. Within the scope of the present disclosure, the term "coordinate system" refers to a device that is set up for uniquely indicating a position of a point in a three-dimensional space, wherein the position of the point can be indicated by means of a numeric or alphanumeric triple in relation to the selected coordinate system. Typically, a Cartesian coordinate system with three coordinates x, y, z arranged spatially perpendicular to one another can be used here. Alternatively, a cylindrical coordinate system can be used here, a system in which the position is indicated by a distance r in relation to a direction z, a value for an angle $\phi$ on a plane perpendicular to the direction z and a value p for a height h above the plane. Depending on the shape of an object on which the point to be specified is located, use of a different coordinate system may also be advantageous, in particular a polar coordinate system, in which the position is indicated by a value for the distance r in relation to the direction z and in each case a value for two angles $\phi$, $\theta$. The spatial relationship between two points can ensure that the position of a point or the length of a distance between two points is uniquely determined in space.

It may be advantageous if all data values of each data set used within the scope of the present disclosure are specified in a coordinate system common to all of the data sets. The common coordinate system may typically be selected here from a coordinate system which relates to a position of the at least one pupil of the at least one eye of the user and the line of sight extending therefrom of the at least one eye of the user through the at least one spectacle lens. Typically, an own coordinate system, which relates to a position of the respective pupil of the relevant eye of the user and the line of sight extending therefrom of the relevant eye of the user through the associated spectacle lens, may be chosen for each of the two eyes. In particular, an origin of the coordinate system related to this may lie in the corneal vertex, wherein typically

- a first axis (z-axis) can be arranged typically parallel to a line of sight, in particular the main line of sight, of the eye of the user, it being possible for positive values to be specified typically in the direction of the eye;
- a second axis (y-axis) can be arranged typically perpendicular to the first axis, it being possible for positive values to be specified typically against the direction of gravity; and
- a third axis (x-axis) can be arranged typically perpendicular to both the first axis and the second axis.

However, a different choice of axes and reference points is conceivable.

Alternatively, the common coordinate system may be chosen such that it relates to both eyes of the user and the lines of sight extending therefrom of the two eyes of the user through the two spectacle lenses. For this purpose, a coordinate system based on coordinates that relate to the spectacle frame may be selected in particular, it typically being possible for these coordinates to be provided by a manufacturer of the spectacle frame. For this purpose, a transformation of a position of the respective corneal vertex and the respective line of sight, in particular the main line of sight, of each of the two eyes of the user into the coordinates that relate to the spectacle frame may typically be performed.

Alternatively, the common coordinate system, which relates to both of the eyes of the user and the lines of sight of the user's two eyes through the two spectacle lenses extending therefrom, may be determined in such a way that, as described in more detail below, first the coordinates of the spectacle frame are recorded by measuring by means of an optical recording unit, typically by means of a tracer or by means of a scanner, typically an optical scanner. The coordinates of the spectacle frame may typically be detected by applying at least one marking to the spectacle frame. After placing the spectacle frame on the user's head or on the virtual representation of the user's head described at the beginning in the form of an avatar or the virtual representation of the spectacle frame, which typically has the at least one marking, a transformation of a position of the respective corneal vertex and the respective line of sight, in particular the main line of sight, of each of the two eyes of the user into those coordinates that relate to the spectacle frame may also typically be performed here onto the virtual representation of the user's head in the form of the avatar.

Further alternatives for the common coordinate system are conceivable.

In a particularly typical configuration, the data values of one or more data sets can be specified in the relevant data set's own coordinate system, it being possible for the respective own coordinate systems for the associated data sets to differ from one another. This configuration may therefore be of particular advantage since it allows adaptation to the objects to be described in the respective coordinate system. For example, the data values of the first data set, which describe inter alia points on the spectacle frame, can be specified in a Cartesian coordinate system, while the data values of the second data set, which concern geometric data on at least one surface of the at least one spectacle lens, which in first approximation has more of a cylindrical shape, can be described in a cylindrical coordinate system, while data values of the third data set, which may relate to a machining of the back surface of the at least one spectacle lens, can be specified in a polar coordinate system. Other examples are however conceivable.

In this configuration, however, the respective own coordinate system for a relevant data set can be chosen such that all data sets can be transformed from the common coordinate system or into the common coordinate system. The term "transform" describes here a calculation rule, referred to as "coordinate transformation," which affects both the respective own coordinate system and the common coordinate system, with which any data value from any data set can be converted from the own coordinate system into the common coordinate system and/or from the common coordinate system into the own coordinate system. This expresses the fact that there is a unique spatial relationship between the own coordinate system of any data set and the common coordinate system, so that the data values from the own coordinate system of any first data set can be transformed by means of a one-to-one coordinate transformation into the data values of the own coordinate system of any second data set by way of the common coordinate system. Alternatively, the data values from the own coordinate system of the any first data set can also be transformed directly into the data values of the own coordinate system of the any second data set, i.e. without going through the common coordinate system. In particular, a respective own coordinate system may be specified for at least one of steps (i) to (iii) of the present computer-implemented method, with all data values in the respective own coordinate system being transformed from the common coordinate system and into the common coordinate system by at least one exclusively mathematical operation.

For the computer-implemented method proposed here, it may in particular be sufficient if
  any data value of the first data set comprising at least one centering value and the three-dimensional model of the spectacle frame can be transformed from its own coordinate system into the common coordinate system;
  any data value from the common coordinate system can be transformed into the own coordinate system of the second data set comprising geometric data values of at least one surface of the at least one spectacle lens;
  any data value of the second data set comprising geometric data values of at least one surface of the at least one spectacle lens can be transformed from its own coordinate system into the common coordinate system, and
  any data value from the common coordinate system can be transformed into the own coordinate system of the third data set comprising in particular data values for machining the back surface of the at least one spectacle lens, for machining the lateral edge of the at least one spectacle lens and for the respective positioning of the at least one spectacle lens,
by means of a respective coordinate transformation.

In this way, typically all data values that are used in the production of the pair of spectacles can be transformed into one another, while maintaining the spatial position of points or distances concerned. This makes it possible for the spectacles to be created with the correct shape and angle, comprising both the production of the at least one spectacle lens from the at least one spectacle lens blank and the fitting of the at least one spectacle lens into the spectacle frame using the at least one centering value, the three-dimensional model of the spectacle frame and the at least one geometric value of at least one surface of the at least one lens.

According to step (i) of the present computer-implemented method, the at least one first data set stored on a storage medium is provided, the first data set comprising
  at least one centering value and
  a three-dimensional model of the spectacle frame In this case, the at least one centering value may typically be determined by creating a centering record with the spectacle frame put on by the user, while the user adopts the habitual head and body posture and a consequently fixed line of sight through the spectacle lens. The spectacle frame put on by the user may in particular comprise a so-called "dummy lens," so that a first corneal vertex distance, which is defined in more detail below, can be determined between the corneal vertex of the at least one eye and the at least one dummy lens. The term "centering value" refers here to a geometric value which is related to the user and/or the spectacle frame and which therefore makes it possible to fit the at least one spectacle lens into the frame adapted to the user, in particular the shape of the head and the eye of the user, as far as possible such that the at least one refractive error of at least one eye of the user is corrected as well as possible by the at least one lens.

The at least one centering value may typically comprise at least one, typically two or three, of the following data values:
  at least one distance from a corneal vertex of at least one eye of the user to a visual point of at least one line of sight through at least one surface of the spectacle lens;
  at least one distance from the visual point to a straight line through at least one lowest point of a frame edge curve of the spectacle frame or an edge curve of the at least one spectacle lens;
  at least one horizontal distance between an identical position on each of the two spectacle lenses.

Other data values that serve as a centering value are however conceivable. In particular, other data values that are determined in the standard can be used for this purpose. However, the at least one first angle used therein, by which a frame plane of the spectacle frame is inclined, or at least a second angle between a lens plane of the at least one spectacle lens and the frame plane are less suitable for this purpose, since they are only based on approximations, which according to the disclosure should be avoided.

Here, the term "visual point" refers to an intersection of a line of sight of the user with the eye-side back surface of the associated spectacle lens. In the event that there are at least two lines of sight on the part of the user, a visual point can consequently be specified for each of the at least two lines of sight. As a further centering value, at least one distance between a visual point and a straight line through at least one lowest point of a frame edge curve of the spectacle frame or an edge curve of the spectacle lens may be specified for the at least one eye of the user, it also being possible for this distance to be referred to as the "eye point." Here, too, a right-side eye point or a left-side eye point may typically be specified, with the "right-side eye point" referring to the right eye of the user and the "left-side eye point" referring to the left eye of the user, in each case from the user's point of view.

Furthermore, the term "corneal vertex" refers to the corneal apex of an eye of the user, wherein a "corneal vertex distance" or "CVD" specified in accordance with the standard 3.2.40, a horizontal distance from the corneal vertex of at least one eye of the user to an associated visual point when the user adopts the habitual head and body posture, and consequently a fixed line of sight through a spectacle lens or a dummy lens, can be used as one of the centering values.

Furthermore, the horizontal distance between an identical position on each of the two spectacle lenses, in particular between the visual point on the left lens and the visual point on the right lens, can determine a horizontal distance between the centering points of the two lenses in a pair of spectacles. The centering point distance can be specified here as a monocular value, measured from a center line of a bridge of the spectacle frame. In particular, this allows the centering point distance to be connected directly to the center line of the bridge of the spectacle frame.

The detecting of the specified centering values, in particular the at least one distance from the corneal vertex, the at least one distance from the visual point to the straight line through the at least one lowest point of the frame edge curve or the edge curve or the at least one horizontal distance between the identical positions on each of the two spectacle lenses, can typically take place with an accuracy of better than ±1 mm.

As already mentioned above, the at least one first data set provided according to step (i) also comprises a three-dimensional model of the spectacle frame. The term "three-dimensional model" refers here to a representation of the spectacle frame in the form of a multiplicity of data points, each data point describing a position on the surface of the spectacle frame in three-dimensional space. In particular, the three-dimensional model of the spectacle frame comprises a multiplicity of data points relating to the frame edge curve of the spectacle frame, in particular the inner contour of the spectacle frame, or the edge curve of a pair of half-rim spectacles or a pair of frameless spectacles. In a typical configuration, the multiplicity of data points may be selected from design data for the spectacle frame, insofar as this is available as a three-dimensional model. In this case, the design data for the spectacle frame may in particular be provided directly from model data from a manufacturer of the spectacle frame, typically from CAD data. Alternatively or additionally, the multiplicity of data points may be recorded by measuring in an optical measurement laboratory by means of an optical recording unit, typically scanned by means of a tracer or recorded by means of a scanner, typically an optical scanner, in particular before the spectacle lenses are adapted to the spectacle frame selected by the user. The device disclosed in WO 2020/127758 A2 for the optical measurement of an inner contour of a spectacle frame can typically be used as an optical scanner for this purpose.

According to step (ii) of the present computer-implemented method, at least one second data set stored on a storage medium is created using the at least one first data set, with the second data set comprising at least one geometric value of at least one surface of the at least one spectacle lens. As already mentioned above, an optical lens used as a spectacle lens may have in particular a front surface facing away from the eye and a back surface on the eye side. The term "geometric value" refers to a data value that is set up to describe the shape of the at least one surface, typically the front surface and back surface, of the at least one spectacle lens. When creating the second data set, the corneal vertex distance in particular can be taken into account from the first data set, since the indication of the effect of the spectacle lens is usually related to a specific corneal vertex distance, so that, if this changes, the indication of the corrective effect of the spectacle lens also changes.

To create the at least one second data set, the following steps may typically be carried out, leading in particular to an optimization of the at least one geometric value of the at least one surface of the at least one spectacle lens and therefore also referred to as the "lens design":

A. In a first step, the spherical front surface facing away from the eye may be determined according to optical and/or aesthetic aspects. Here, a radius of the front surface, as disclosed in EP 0 857 993 B2, can typically be selected from semi-finished products with spherical or aspherically rotationally symmetrical, convex front surfaces with few different radii. Already when selecting the front surface, it may be particularly advantageous to take into account an adaptation of the front surface to the frame shape of the frame edge curve of the spectacle frame or the edge curve of the half-rim spectacles or frameless spectacles as well as the at least one centering value.

B. In a further step, a position of the front surface in front of the eye may be determined while taking into account the shape of the frame and the three-dimensional course of the frame edge curve or the edge curve. In this case, the common coordinate system, in particular the coordinate system of the eye, can typically be used as the coordinate system for the data values of the second data set, which at the same time also determines the coordinate transformation of the data values assigned to the front surface of the spectacle lens into the coordinate system of the eye.

C. In a further step, the back surface of the spectacle lens may be determined, while taking into account the following points in particular:

The desired corrective effect of the spectacle lens in relation to the at least one refractive error of the eye of the user should be achievable at at least one predetermined reference point on the front surface of the spectacle lens.

A distribution of optical image errors should correspond as well as possible to a predetermined target distribution. In order to achieve this, an optimization can typically be carried out, changing the back surface iteratively, starting from an initially determined starting surface, such that a difference from the target distribution remains below at least one predetermined limit value or a further iteration no longer brings any improvement. The effect of the optimized spectacle lens for the user can be calculated here at a multiplicity of visual points on the spectacle lens in relation to the vertex sphere and compared with the target value specified there. A rotation of the eye of the user around a predetermined eye rotation point can typically be simulated here, while taking into account the so-called "Listing's rule." Listing's rule states that all eye movements that lead from the primary position of the eye to a secondary position or to a tertiary position of the eye are conceivable as ductions about axes that lie in one plane.

In particular, a change in a thickness of the spectacle lens, which is defined by a distance between the front surface and the back surface of the lens, can take place during the iteration. The reasons for this may be specifications for the thickness and/or stability conditions for the spectacle lens at the thinnest points. In particular, here, too, the frame edge curve of the spectacle frame or the edge curve of the half-rim spectacles or frameless spectacles may be taken into account, especially since the thinnest point of the lens may be close to the edge of the lens. The corneal vertex distance in particular may therefore change during the iteration. It may therefore be advantageous to calculate the corrective effect of the spectacle lens at the previously specified reference point in each iteration step and to convert it to the corneal vertex distance originally specified as the centering value in such a way that the corrective effect of the spectacle lens calculated in this way corresponds to the desired correction value for the spectacle lens.

After optimization has taken place, the data values of the back surface of the spectacle lens are usually available in their own coordinate system. However, the transformation of these data values into the common coordinate system is known.

As already mentioned above, during step (i) the at least one centering value can typically be determined by creating a centering record with the spectacle frame put on by the user, which comprises at least one dummy lens, so that a first corneal vertex distance can be determined here. In contrast, the optical effect of the at least one spectacle lens calculated according to step (ii) relates to a real and optimized position and orientation of the front surface of the spectacle lens in relation to the spectacle frame, while taking into account the facet formation and edge stability of the at least one spectacle lens, so that here, as explained in more detail in the exemplary embodiments, a second corneal vertex distance can be determined.

In a typical configuration of the present disclosure, at least one second data set may comprise at least one additional data value that specifies a lens selection for the at least one spectacle lens. As mentioned at the beginning the "lens selection" relates to a property of the at least one spectacle lens, in particular a lens type, a refractive index, a tint and at least one optional coating of a spectacle lens.

If the calculation of the spectacle lens according to step (ii) is completed in such a way that the at least one second data set, which comprises at least one geometric value of at least one surface of the at least one spectacle lens, is available, the following properties of the at least one eye, the spectacle frame and the at least one spectacle lens are not only known, but are in a one-to-one relationship with one another:

positions of the front surface and the back surface of the at least one spectacle lens in the common coordinate system, in particular the coordinate system of the eye, or in relation to the common coordinate system;

geometric values of the front surface and the back surface of the at least one spectacle lens in the own coordinate system and associated coordinate transformations into the common coordinate system, in particular the coordinate system of the eye;

the frame edge curve of the spectacle frame or the edge curve of the half-rim spectacles or frameless spectacles in the common coordinate system, in particular the coordinate system of the eye, or in relation to the common coordinate system;

parameters for the coordinate transformations, in particular between the common coordinate system, in particular the coordinate system of the eye, and the respective own coordinate systems of the front surface of the at least one spectacle lens, the back surface of the at least one spectacle lens, and the frame edge curve of the spectacle frame or the edge curve of the half-rim spectacles or frameless spectacles. This means that all other conceivable coordinate transformations are also determined, e.g., from the respective own coordinate systems or into the respective own coordinate systems of the front surface of the at least one spectacle lens and the back surface of the at least one spectacle lens.

In other words, after completion of step (ii) of the present computer-implemented method, a so-called "digital twin," formed from the data values of the at least one first data set and the at least one second data set, is stored on a storage medium as a virtual representation of the spectacles, from which then, according to step (iii) of the present computer-implemented method, at least one third data set stored on a storage medium is created, set up for producing the at least one spectacle lens from at least one spectacle lens blank and for grinding and/or fitting the at least one spectacle lens into the spectacle frame using the at least one third data set. The term "virtual representation" refers here to storage of an object, in particular a spectacle frame or a pair of spectacles, in a virtual space. The virtual representation may comprise a representation on an optical display device, in particular a monitor connected to a computer or a screen, e.g., a touch-sensitive screen (touch screen), of a mobile communication device, in particular a smartphone or tablet. The at least one third data set may also be referred to here as a "production data set," since each data value of the at least one third data set typically comprises at least one piece of information relating to the production of the at least one spectacle lens or to grinding and/or fitting the at least one spectacle lens into the spectacle frame, wherein the information can be used in a method for producing at least one pair of spectacles.

In a further aspect, the present disclosure relates to a method for producing a pair of spectacles, which comprises the following method steps:
  (I) generating data for the production of at least one spectacle lens adapted to a spectacle frame of a pair of spectacles according to a computer-implemented method described herein for generating data for the production of at least one spectacle lens adapted to a spectacle frame of a pair of spectacles;
  (II) producing the at least one spectacle lens from at least one spectacle lens blank and grinding and/or fitting the at least one spectacle lens into the spectacle frame using the third data set of the data generated according to step (I).

The production of the at least one spectacle lens from the at least one spectacle lens blank according to step (II) of the present method for producing a pair of spectacles may typically comprise at least one, typically two or three of the following steps a) to c), whereby further steps not specified herein can be carried out, the steps each being carried out using the at least one third data set:
  a) inserting a spectacle lens blank into a holding device for fixing the spectacle lens blank;
  b) machining a lateral edge of the spectacle lens blank, as a result of which an edge shape of the spectacle lens is determined;
  c) machining at least one surface of the spectacle lens blank, as a result of which a corrective effect of the spectacle lens is obtained.

In a typical configuration, step b) can be carried out before step c). In this configuration, the spectacle lens blank may remain in the holding device for fixing the spectacle lens blank after step b) or can be inserted into a further holding device for renewed fixing of the spectacle lens blank before carrying out step c). In an alternative configuration, step c) may typically be carried out before step b). In this configuration, the spectacle lens blank may remain in the holding device for fixing the spectacle lens blank after step c) or may be inserted into a further holding device for renewed fixing of the spectacle lens blank before carrying out step b).

Typically, in particular before step b), at least one marking may be applied to the back surface of the spectacle lens using the third data set, so that the machining of the lateral edge of the spectacle lens according to step b) can be performed using the at least one marking on the back surface of the lens in such a way that a desired edge shape of the spectacle lens is thus obtained. The at least one marking on the back surface of the spectacle lens may typically take the form here of reference marks, in particular in the form of at least three, typically exactly three, reference points that lie on a sphere.

In addition, at least one further marking may be applied to the front surface of the spectacle lens. A laser may typically be used for applying the at least one further marking to the front surface of the spectacle lens, the laser being able to perform the desired further marking on the spectacle lens already fixed according to step a). Other ways of applying the at least one further marking are however conceivable.

According to step a), the spectacle lens blank can be inserted into a holding device for fixing the spectacle lens blank. For this purpose, a so-called "blocking" of the spectacle lens blank may typically be carried out, allowing machining of the spectacle lens blank according to step b) or step c) in at least one machining device set up for this purpose, which is set up for creating the lateral edge of the spectacle lens and/or the desired back surface of the spectacle lens. The machining of the spectacle lens blank may typically comprise removing material from at least one surface of the spectacle lens blank, in particular by milling, turning, grinding, precision grinding and/or polishing. In this case it may be necessary for both surfaces of the spectacle lens blank to undergo machining, it being possible for the spectacle lens blank to be turned over by means of a turning device after the machining of a first surface has been completed. Typically, however, semi-finished products may be used, having an already finished front surface, optionally provided with at least one coating that has also already been applied to it, so that only the back surface, also referred to as the "prescription surface," of the spectacle lens blank undergoes machining. Typically, before the machining, those lens surfaces of the spectacle lens blank that are not machined can be provided with a protective device, in particular a film or a coating.

In particular, in the case of blocking, the spectacle lens blank may be attached by its front surface to a block piece, the spectacle lens blank that is fixedly connected to the block piece subsequently being able to be inserted into the at least one machining device. A metal alloy having a low melting point may typically be used as a bonding means for establishing a connection between the block piece and the spectacle lens blank, after the curing of which the spectacle lens blank is firmly connected to the block piece, so that they can together undergo machining. In an alternative configuration, a UV-curing adhesive may be used for this. Other ways of fixing the spectacle lens blank are conceivable.

The machining of the lateral edge of the spectacle lens according to step b) for determining the edge shape of the spectacle lens, which is also referred to as "remote edging," may typically take place by removing material from the edge of the spectacle lens, in particular by milling, turning, grinding, precision grinding and/or polishing. Here, a determination of the removal of material can take place by transmitting the data values from the at least one third data set, which, as mentioned above, is formed from the data values of the at least one first data set and the at least one second data set and therefore has both the data values in relation to the at least one spectacle lens and the spectacle frame, by means of at least one interface to the at least one machining device. In particular, a VCA machine interface or an OPC-UA machine interface can be used here, e.g., as a step file for transformation into CNC coordinates in relation to a front surface of a clamping dome and the reference marks on the back side of the lens.

Independently of the machine interfaces actually used here, it can also be ensured in this way that the fixing of the spectacle lens in the holding device and the machining of the edge of the spectacle lens in the at least one machining device takes place in such a way that the edge shape of the spectacle lens also actually corresponds to the data values of the first data set. The reason for this is that a precisely determined coordinate transformation from the common coordinate system into an own coordinate system of the holding device and/or the at least one machining device can take place, so that the coordinates are only converted from a first coordinate system into a second coordinate system, with the actual position of the points in space affected by this remaining unchanged.

In order to perform the machining of the spectacle lens blank according to step c), in order in this way to obtain the desired back surface of the spectacle lens according to the data values of the second data set, a coordinate transformation can take place from the common coordinate system into an own coordinate system of the holding device and/or the at least one machining device. Here, imaging techniques can typically be used to avoid possible errors when inserting the spectacle lens blank into the holding device and/or the at least one machining device. Here, typically a parallax compensation may be performed, especially in order to compensate for parallax errors occurring due to a possible tipping or a possible offset when blocking the spectacle lens blank. For the machining of the spectacle lens blank, the at least one machining device can typically access a CNC coordinate point cloud, from which machining splines are ascertained in an own coordinate system of the at least one machining device. In this way it can be ensured that the fixing of the spectacle lens blank in the holding device and the machining of the spectacle lens blank in the at least one machining device take place in such a way that the front surface and the back surface of the spectacle lens also actually correspond to the data values of the second data set. Alternatively or additionally, the shape of the prescription surface may be described as a mathematical formula directly in the coordinate system of the at least one machining machine. In this way it is possible in particular to avoid errors occurring between an optical calculation and an approximation of the surface points by machining software controlling the at least one machining machine.

Furthermore, according to step (II), the at least one spectacle lens can then be fitted into the spectacle frame, as a result of which the finished pair of spectacles is then obtained. Due to the procedure in the computer-implemented method described herein of consistently specifying the data values of each data set in relation to a respective coordinate system, with all data values of each data set being specified in a coordinate system common to all data sets or being transformed from the common coordinate system or into the common coordinate system, any deviations, errors and/or tolerances that may occur no longer add up. The finished pair of spectacles thus meet the user's requirements, with the spectacle frame being adapted precisely to the user's head and the spectacle lenses correctly correcting the at least one refractive error of the user without the user being able to experience intolerance. As a result, the user likes to wear the custom-made spectacles and in particular will not make any complaints to the optician in relation to the custom-made spectacles.

In a further aspect, the present disclosure relates to a computer program which comprises instructions executable by a computer, the instructions having the effect when the program is executed of causing the computer to perform at least one of the steps, typically all the steps, of the computer-implemented method described herein for generating data for the production of at least one spectacle lens adapted to a spectacle frame of a pair of spectacles.

In a further aspect, the present disclosure relates to a computer-readable storage medium, on which there is stored at least one data set, which is used in a computer-implemented method described herein for generating data for the production of at least one spectacle lens adapted to a spectacle frame of a pair of spectacles.

For further details in relation to the computer program and/or the computer-readable storage medium, reference is made to the remainder of the description.

In a further aspect, the present disclosure relates to a system for producing at least one spectacle lens adapted to a spectacle frame of a pair of spectacles. The term "system" refers here to a device of a multi-part configuration, with different parts of the system at least partially interacting. The present system comprises:
- at least one first device, which is set up for determining at least one centering value;
- at least one second device, which is set up for determining a three-dimensional model of the spectacle frame;
- at least one third device, which is set up for determining at least one geometric value of at least one surface of the at least one spectacle lens;
- at least one first evaluation unit, comprising:
  - at least one first input interface, which is set up for receiving the at least one centering value and the three-dimensional model of the spectacle frame;
  - at least one first calculation unit, which is set up for ascertaining at least one first data set, the first data set comprising at least the following data values: at least one centering value; a three-dimensional model of the spectacle frame;
  - at least one first output interface, which is set up for providing the at least one first data set;
- at least one second evaluation unit, comprising:
  - at least one second interface, which is set up for receiving the at least one first data set and the at least one geometric value of the at least one surface of the at least one spectacle lens;
  - at least one second calculation unit, which is set up for ascertaining at least one second data set using the at least one first data set, the second data set comprising at least the following data values: at least one geometric value of at least one surface of the at least one spectacle lens;
  - at least one second output interface, which is set up for providing the at least one second data set;
- at least one third evaluation unit, comprising:
  - at least one third input interface, which is set up for receiving the at least one first data set and the at least one second data set;
  - at least one third calculation unit, which is set up for ascertaining at least one third data set for producing the at least one spectacle lens from at least one spectacle lens blank and for grinding and/or fitting the at least one spectacle lens into the spectacle frame using the at least one first data set and the at least one second data set;
  - at least one third output interface, which is set up for providing the at least one third data set;
- at least one control unit, comprising:
  - at least one fourth interface, which is set up for receiving the at least one third data set;
  - at least one production unit, which is set up for producing the at least one spectacle lens from the at least one spectacle lens blank and for grinding and/or fitting the at least one spectacle lens into the spectacle frame using the at least one third data set, wherein the data values of each data set have a spatial relationship with one another in that the data values of each data set are consistently specified in relation to a respective coordinate system, with all data values of each data set being specified in a coordinate system common to all data sets or being transformed from the common coordinate system or into the common coordinate system.

According to the disclosure, the spatial relationship is achieved in that each calculation unit is set up to specify the data values of each data set in relation to a respective coordinate system and to specify all data values of each data set in a coordinate system common to all data sets or to transform them from the common coordinate system or into the common coordinate system. For this purpose, each calculation unit may be set up in particular to use a respective own coordinate system and to transform all data values in the respective own coordinate system from the common coordinate system and into the common coordinate system by at least one exclusively mathematical operation.

In a typical configuration, the at least one first evaluation unit may comprise a first storage medium, which is set up for storing the at least one first data set, and/or the at least one second evaluation unit may comprise a second storage medium, which is set up for storing the at least one second data set, and/or the at least one third evaluation unit may comprise a third storage medium, which is set up for storing the at least one third data set.

For further details in relation to the system for producing at least one spectacle lens adapted to a spectacle frame of a pair of spectacles, reference is made to the rest of the description.

In summary, within the scope of the present disclosure, the exemplary embodiments according to the following Clauses are particularly typical:

Clause 1: A computer-implemented method for generating data for the production of at least one spectacle lens adapted to a spectacle frame of a pair of spectacles or for generating a virtual representation of the at least one spectacle lens or the pair of spectacles, the computer-implemented method comprising the following steps:
  (i) providing at least one first data set stored on a storage medium, the first data set comprising at least the following data values:
    at least one centering value;
    a three-dimensional model of the spectacle frame;
  (ii) creating at least one second data set stored on a storage medium using the at least one first data set, the second data set comprising at least the following data values:
    at least one geometric value of at least one surface of the at least one spectacle lens;
  (iii) creating at least one third data set stored on a storage medium for producing the at least one spectacle lens from at least one spectacle lens blank and for grinding and/or fitting the at least one spectacle lens into the spectacle frame using the at least one first data set and the at least one second data set, the data values of each data set being spatially related to one another.

Clause 2: The computer-implemented method according to the preceding clause, wherein the spatial relationship is achieved in that the data values of each data set are specified in relation to a respective coordinate system, wherein all data values of each data set are specified in a coordinate system common to all data sets or transformed from the common coordinate system or into the common coordinate system.

Clause 3: The computer-implemented method according to one of the preceding clauses, wherein a respective own coordinate system is specified for at least one of steps (i) to (iii), with all data values in the respective own coordinate system being transformed from the common coordinate system and into the common coordinate system by at least one exclusively mathematical operation.

Clause 4: The computer-implemented method according to one of the preceding clauses, wherein a respective own coordinate system is specified for at least one of steps (i) to (iii), it being possible to transform all data values in the respective own coordinate system from the common coordinate system and into the common coordinate system.

Clause 5: The computer-implemented method according to one of the preceding clauses, wherein the common coordinate system is selected from a coordinate system which relates to a position of the at least one pupil of the at least one eye of the user and the line of sight extending therefrom of the at least one eye of the user through the at least one spectacle lens.

Clause 6: The computer-implemented method according to the preceding clause, wherein an own coordinate system, which relates to a position of the respective pupil of the relevant eye of the user and the line of sight extending therefrom of the relevant eye of the user through the associated spectacle lens, is chosen for each of the two eyes.

Clause 7: The computer-implemented method according to the preceding clause, wherein an origin of the own coordinate system for each of the two eyes lies in the respective vertex of the cornea of the relevant eye of the user.

Clause 8: The computer-implemented method according to one of the two preceding clauses, wherein the own coordinate system for each of the two eyes has
- a first axis parallel to a line of sight, in particular a main line of sight, of the eye of the user;
- a second axis perpendicular to the first axis parallel to the direction of gravity; and
- a third axis perpendicular to both the first axis and the second axis Clause 9: The computer-implemented method according to one of the four preceding clauses, wherein the common coordinate system relates to both eyes of the user and the lines of sight extending therefrom of the two eyes of the user through the two spectacle lenses.

Clause 10: The computer-implemented method according to the preceding clause, wherein the common coordinate system is based on coordinates that relate to the spectacle frame.

Clause 11: The computer-implemented method according to the preceding clause, wherein the coordinates that relate to the spectacle frame are provided by a manufacturer of the spectacle frame.

Clause 12: The computer-implemented method according to the preceding clause, wherein a transformation of a position of the respective corneal vertex and the respective line of sight, in particular the main line of sight, of each of the two eyes of the user into the coordinates that relate to the spectacle frame is performed.

Clause 13: The computer-implemented method according to one of the three preceding clauses, wherein the coordinates relating to the spectacle frame are based on a measuring-based recording of the coordinates of the spectacle frame by means of an optical recording unit, typically by means of a tracer or by means of a scanner, typically an optical scanner.

Clause 14: The computer-implemented method according to the preceding clause, wherein the coordinates of the spectacle frame are recorded by applying at least one marking to the spectacle frame.

Clause 15: The computer-implemented method according to the preceding clause, wherein, after placing the spectacle frame on the user's head or on a virtual representation of the user's head in the form of an avatar or the virtual representation of the spectacle frame, which has the at least one marking, a transformation of the position of the respective corneal vertex and the respective line of sight, in particular the main line of sight, of each of the two eyes of the user into the coordinates that relate to the spectacle frame is performed here onto the virtual representation of the user's head in the form of the avatar.

Clause 16: The computer-implemented method according to one of the preceding clauses, wherein the at least one centering value is determined by creating a centering record with the spectacle frame put on by the user, while the user adopts the habitual head and body posture and a fixed line of sight through at least one dummy lens fitted into the spectacle frame.

Clause 17: The computer-implemented method according to one of the preceding clauses, wherein the at least one centering value comprises at least one of the following data values:
- at least one distance from a corneal vertex of at least one eye of the user to a visual point of at least one line of sight through at least one surface of the spectacle lens;
- at least one distance from the visual point to a straight line through at least one lowest point of a frame edge curve of the spectacle frame or an edge curve of the at least one spectacle lens;
- at least one horizontal distance between an identical position on each of the two lenses.

Clause 18: The computer-implemented method according to the preceding clause, wherein the three-dimensional model of the spectacle frame comprises a multiplicity of data points relating to the frame edge curve of the spectacle frame.

Clause 19: The computer-implemented method according to the preceding clause, wherein the multiplicity of data points are selected from provided spatial design data of the spectacle frame.

Clause 20: The computer-implemented method according to the preceding clause, wherein the design data for the spectacle frame are provided directly from model data from a manufacturer of the spectacle frame, typically from CAD data.

Clause 21: The computer-implemented method according to one of the three preceding clauses, wherein the multiplicity of data points are recorded by measuring using the spectacle frame.

Clause 22: The computer-implemented method according to the preceding clause, wherein the multiplicity of data points are recorded by measuring in an optical measurement laboratory by means of an optical recording unit, typically scanned using a tracer, or recorded using a scanner, typically an optical scanner.

Clause 23: The computer-implemented method according to one of the preceding clauses, wherein the at least one geometric value relates to a three-dimensional shape of the spectacle lens, wherein the three-dimensional shape of the spectacle lens comprises a spherical or aspherically rotationally symmetrical convex front surface and a back surface of the spectacle lens designed for correcting at least one refractive error of at least one eye of the user.

Clause 24: The computer-implemented method according to the preceding clause, wherein, starting from a determined starting surface, at least one optimization step for determining the back surface for the user is performed.

Clause 25: The computer-implemented method according to the preceding clause, wherein the at least one centering value from the at least one first data set is used as a boundary condition for the at least one optimization step.

Clause 26: The computer-implemented method according to one of the preceding clauses, wherein the at least one second data set comprises at least one further data value that specifies a lens selection for the at least one spectacle lens.

Clause 27: A computer program for carrying out a method for generating data for the production of at least one spectacle lens adapted to a spectacle frame of a pair of spectacles or for generating a virtual representation of the at least one spectacle lens or the pair of spectacles according to one of clauses 1 to 26.

Clause 28: A computer-readable storage medium, on which there is stored at least one data set, which is used in a computer-implemented method for generating data for the production of at least one spectacle lens adapted to a spectacle frame of a pair of spectacles or for generating a virtual representation of the at least one spectacle lens or the pair of spectacles according to one of clauses 1 to 26.

Clause 29: A method for producing a pair of spectacles, the method comprising the following steps:
- (I) generating data for the production of at least one spectacle lens adapted to a spectacle frame of a pair of spectacles or for generating a virtual representation of the at least one spectacle lens or the pair of spectacles according to a computer-implemented method for generating data for the production of at least one spectacle lens adapted to a spectacle frame of a pair of spectacles or for generating a virtual representation of the at least one spectacle lens or the pair of spectacles according to one of the preceding clauses;
- (II) producing the at least one spectacle lens from at least one spectacle lens blank and grinding and/or inserting the at least one spectacle lens into the spectacle frame using the third data set of the data generated according to step (I).

Clause 30: The method according to one of the preceding clauses, wherein the production of the at least one spectacle lens from the at least one spectacle lens blank comprises the following steps:
- a) inserting a spectacle lens blank into a holding device for fixing the spectacle lens blank;
- b) machining a lateral edge of the spectacle lens, as a result of which an edge shape of the spectacle lens is determined;
- c) machining at least one surface of the spectacle lens blank, as a result of which a corrective effect of the spectacle lens is obtained.

wherein steps a) to c) are each performed using the at least one third data set.

Clause 31: The method according to the preceding clause, wherein step b) is carried out before step c), or wherein step c) is carried out before step b).

Clause 32: The method according to the two preceding clauses, wherein step a) comprises attaching the spectacle lens blank by its front surface to a block piece.

Clause 33: The method according to the preceding clause, wherein a metal alloy having a low melting point or a UV-curing adhesive is used as a bonding means for establishing a connection between the block piece and the spectacle lens blank, after which curing the spectacle lens blank is firmly connected to the block piece.

Clause 34: The method according to one of the three preceding clauses, wherein the spectacle lens blank firmly connected to the block piece is inserted into at least one machining device during step c).

Clause 35: The method according to one of the five preceding clauses, wherein both surfaces of the spectacle lens blank undergo the machining according to step c).

Clause 36: The method according to one of the six preceding clauses, wherein semi-finished products are used, having an already finished front surface, with only the back surface of the spectacle lens blank undergoing the machining according to step c).

Clause 37: The method according to one of the seven preceding clauses, wherein, before the machining of the spectacle lens blank according to step c), those lens surfaces that are not machined are provided with a protective device, in particular a film or a coating.

Clause 38: The method according to one of the eight preceding clauses, wherein the machining of at least one surface of the spectacle lens blank according to step c) and/or the machining of the lateral edge of the spectacle lens according to step b) comprises removing material from at least one surface of the spectacle lens blank.

Clause 39: The method according to the preceding clause, where the removal of material comprises milling, turning, grinding, fine grinding and/or polishing of the at least one surface of the spectacle lens blank.

Clause 40: The method according to the preceding clause, wherein before step b) at least one marking is applied to the back surface of the spectacle lens using the third data set, step b) being carried out using the at least one marking on the back surface of the spectacle lens.

Clause 41: The method according to the preceding clause, wherein before step b) at least one further marking is applied to the front surface of the spectacle lens using the third data set.

Clause 42: The method according to the preceding clause, wherein the at least one further marking is applied to the front surface of the spectacle lens by means of a laser.

Clause 43: A system for producing at least one spectacle lens adapted to a spectacle frame of a pair of spectacles, comprising
- at least one first device, which is set up for determining at least one centering value;
- at least one second device, which is set up for determining a three-dimensional model of the spectacle frame;
- at least one third device, which is set up for determining at least one geometric value of at least one surface of the at least one spectacle lens;
- at least one first evaluation unit, comprising:
  - at least one first input interface, which is set up for receiving the at least one centering value and the three-dimensional model of the spectacle frame;
  - at least one first calculation unit, which is set up for ascertaining at least one first data set, the first data set comprising at least the following data values: at least one centering value; a three-dimensional model of the spectacle frame;
  - at least one first output interface, which is set up for providing the at least one first data set;
- at least one second evaluation unit, comprising:
  - at least one second interface, which is set up for receiving the at least one first data set and the at least one geometric value of the at least one surface of the at least one spectacle lens;
  - at least one second calculation unit, which is set up for ascertaining at least one second data set using the at least one first data set, the second data set comprising at least the following data values: at least one geometric value of at least one surface of the at least one spectacle lens;
  - at least one second output interface, which is set up for providing the at least one second data set;
- at least one third evaluation unit, comprising:
  - at least one third input interface, which is set up for receiving the at least one first data set and the at least one second data set;

at least one third calculation unit, which is set up for ascertaining at least one third data set for producing the at least one spectacle lens from at least one spectacle lens blank and for grinding and/or inserting the at least one spectacle lens into the spectacle frame using the at least one first data set and the at least one second data set;
at least one third output interface, which is set up for providing the at least one third data set;
at least one control unit, comprising:
at least one fourth interface, which is set up for receiving the at least one third data set;
at least one production unit, which is set up for producing the at least one spectacle lens from the at least one spectacle lens blank and for grinding and/or fitting the at least one spectacle lens into the spectacle frame using the at least one third data set,
the data values of each data set being spatially related to one another.

Clause 44: The system according to the preceding clause, wherein the spatial relationship is achieved in that each calculation unit is set up to specify the data values of each data set in relation to a respective coordinate system and to specify all data values of each data set in a coordinate system common to all data sets or to transform them from the common coordinate system or into the common coordinate system.

Clause 45: The system according to one of the preceding clauses relating to the system, wherein each calculation unit is set up to use a respective own coordinate system and to transform all data values in the respective own coordinate system from the common coordinate system and into the common coordinate system by at least one exclusively mathematical operation.

Clause 46: The system according to one of the preceding clauses relating to the system, wherein the at least one first evaluation unit also comprises a first storage medium, which is set up for storing the at least one first data set.

Clause 47: The system according to one of the preceding clauses relating to the system, wherein the at least one second evaluation unit also comprises a second storage medium, which is set up for storing the at least one second data set.

Clause 48: The system according to one of the preceding clauses relating to the system, wherein the at least one third evaluation unit also comprises a third storage medium, which is set up for storing the at least one third data set.

Further details and features of the disclosure will become apparent from the following description of typical exemplary embodiments, in particular in conjunction with the dependent claims. The respective features of the dependent claims may be implemented separately, or several of them may be implemented in combination with one another. The disclosure is not restricted to the exemplary embodiments. The exemplary embodiments are schematically represented in the drawings. References which are the same in the individual drawings denote elements which are the same or have the same function or elements which correspond to one another in respect of their functions.

BRIEF DESCRIPTION OF THE DRAWINGS

The disclosure will now be described with reference to the drawings wherein.

DESCRIPTION OF THE EXEMPLARY EMBODIMENTS

Figure 1:
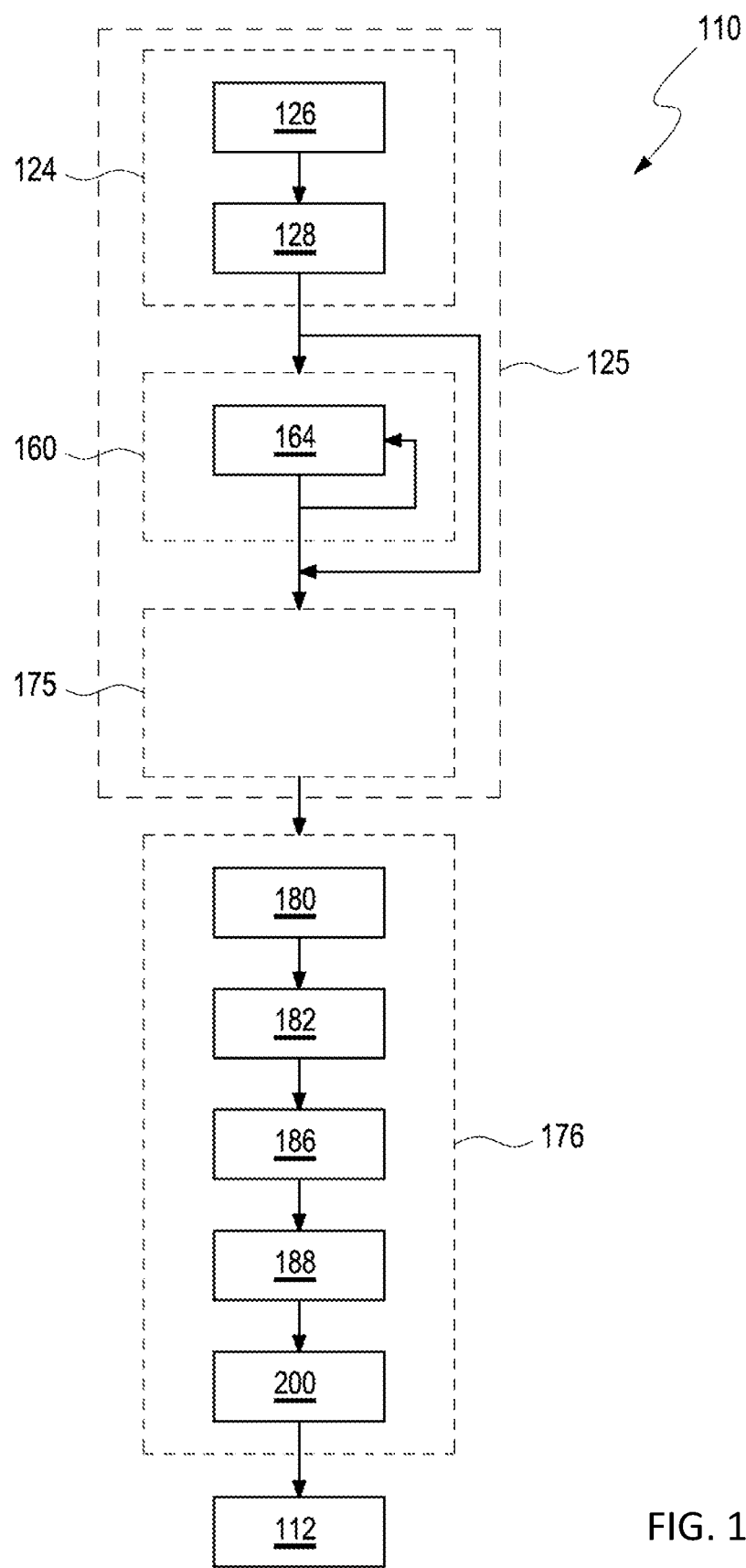
FIG. 1 shows a schematic representation of a typical embodiment of the method according to the disclosure for the production of spectacles.
Figures 2A, 2B:
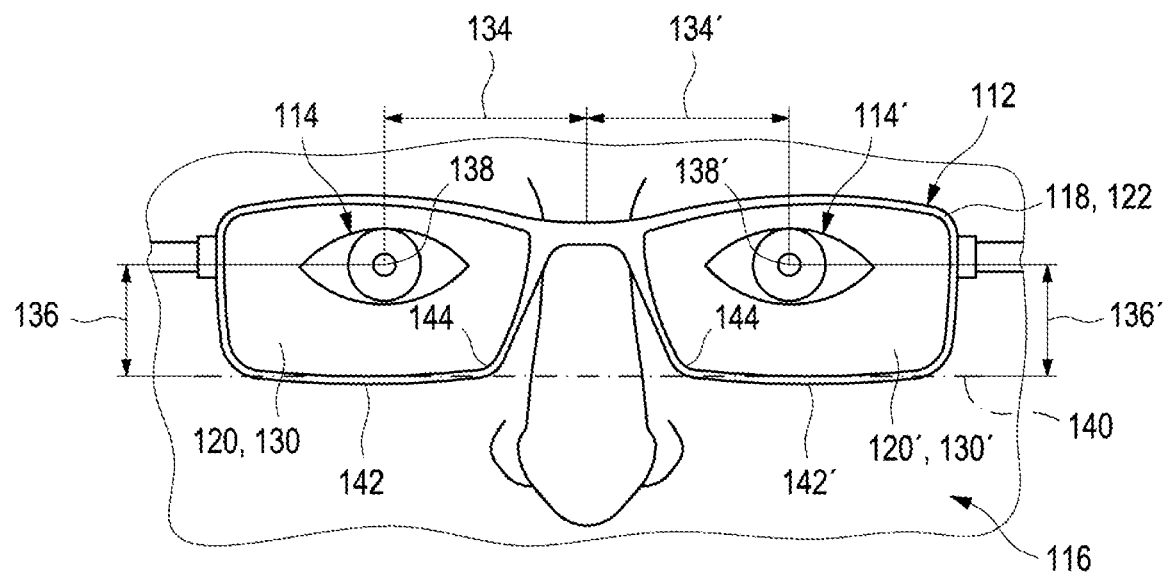
FIGS. 2A and 2B show a schematic representation of an eye area of a user with spectacles put on by the user, while the user adopts the habitual head and body posture and a fixed line of sight, from a frontal perspective (FIG. 2A) and in a perspective representation obliquely from above (FIG. 2B)
Figure 3A:
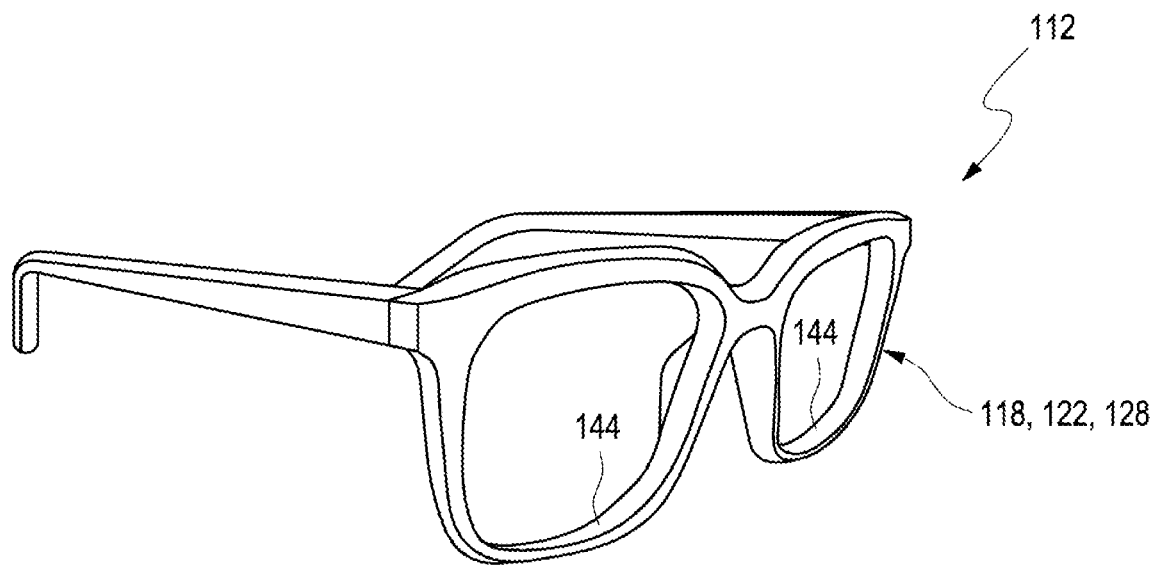
FIGS. 3A and 3B show a schematic representation of a three-dimensional model of a spectacle frame (FIG. 3A) and a multiplicity of data points which correspond to the frame edge curve of the spectacle frame (FIG. 3B)

FIG. 1 shows a schematic representation of a typical embodiment of the method 110 according to the disclosure for producing a pair of spectacles 112 for both eyes 114, 114' of a user 116. As schematically shown in particular in FIGS. 2A and 6A, the spectacles 112 comprise a spectacle frame 118 and two spectacle lenses 120, 120' fitted therein. The spectacle frame 118 schematically shown in FIGS. 2A and 3A is a pair of full-rim spectacles which has a spectacle frame 122 that encloses the two spectacle lenses 120, 120'. For the sake of simplicity, the following description therefore refers to full-rim spectacles with two spectacle lenses 120, 120' fitted therein. However, the present method 110 for producing the spectacles 112 can also be used analogously for half-rim spectacles, schematically shown in FIG. 2B, in which the two spectacle lenses 120, 120' only partially adjoin the frame 122, or for frameless spectacles, in which the two spectacle lenses 120, 120' have a bore for receiving a holder for attachment to the spectacle frame 122. An application to a monocle, which has a spectacle frame 122 that is only set up to receive a single spectacle lens 120 for a single eye 114 of the user 116, is analogously possible.

A providing step 124, according to step (i) of a computer-implemented method 125 for generating data for the production of the spectacle lens 120, 120' adapted to the spectacle frame 118 of the pair of spectacles 112 or for generating a virtual representation of the spectacle lens 120, 120' or the pair of spectacles 112, involves first providing a first data set stored on a storage medium, the first data set comprising at least one centering value 126 and a three-dimensional model 128 of the spectacle frame 118. As schematically shown in particular in FIGS. 2A and 2B, the at least one centering value 126 is determined by means of a centering record, with the centering record, as shown in FIGS. 2A and 2B, typically being created with the spectacles 112 put on by the user 116, while the user 116 adopts the habitual head and body posture and a fixed line of sight through dummy lenses 130, 130' contained in the spectacles 112.

As also schematically shown in particular in FIGS. 2A and 2B, the at least one centering value 126 may comprise at least one of the following data values, with each of the data values typically being specified in a coordinate system of the eyes 114, 114' of the user 116, which, as schematically shown in FIGS. 2A and 2B, has coordinates x, y, z and which can be used in particular as a common coordinate system 132:

- a respective interpupillary distance 134, 134' for the two eyes 114, 114' of the user 116;
- a distance, also referred to as the eye point 136, 136', from a respective visual point 138, 138' for each of the two eyes 114, 114' to a straight line 140 through at least one respective lowest point 142, 142' of a frame edge curve 144 of the spectacle frame 118;
- a distance, also referred to as the first corneal vertex distance 146, 146', from a corneal vertex 148, 148' of the respective eye 114, 114' of the user 116 to the respective visual point 138, 138' of an associated line of sight 150, 150' through a respective back surface 152, 152' on the eye side of the relevant dummy lenses 130, 130'.

Less suitable, since they are only based on approximations, which according to the disclosure are to be avoided, are a first angle 154, referred to as the "pre-tilt angle," by which a frame plane (not shown) of the spectacle frame 118 is inclined, in particular with respect to a perpendicular that lies parallel to the direction y in the common coordinate system 132, and a second angle 156, 156' between a respective lens plane (not shown) of the two spectacle lenses 120, 120' and the frame plane.

Figure 3B:
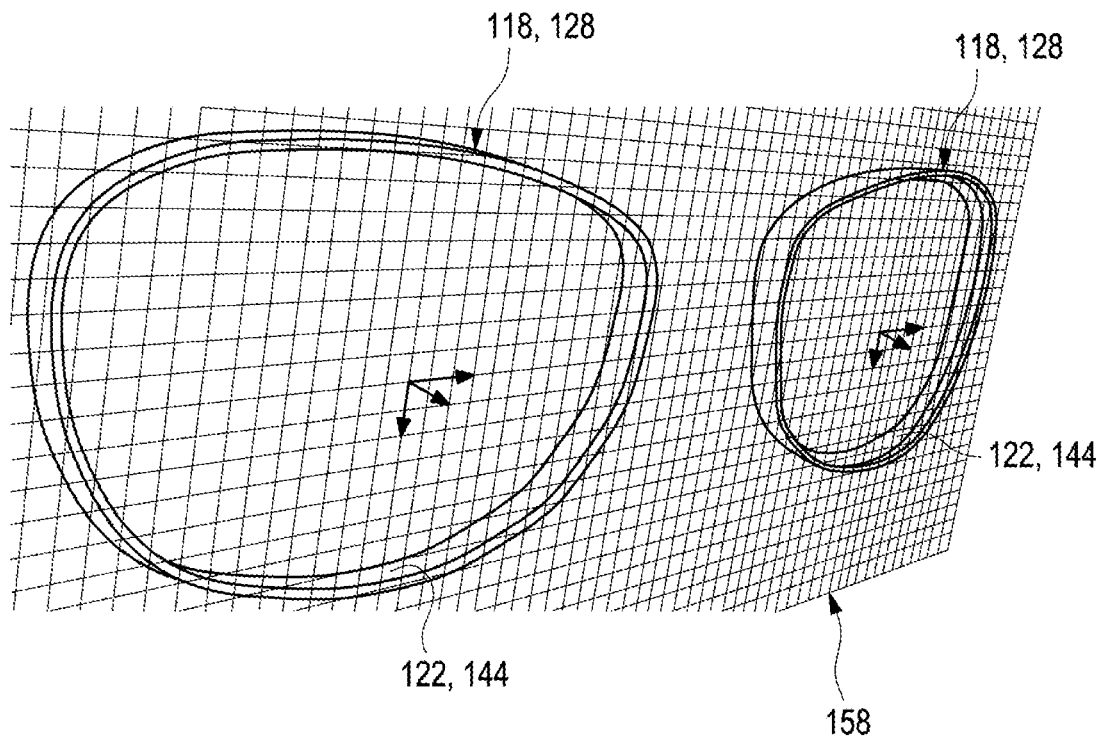

As further schematically shown in particular in FIGS. 3A and 3B, the three-dimensional model 128 of the spectacle frame 118 may comprise a multiplicity of data points which relate to the frame edge curve 144 of the spectacle frame 118. As FIG. 3A schematically shows, design data for the spectacle frame 118 may be provided for this purpose, in particular directly from model data from a manufacturer of the spectacle frame 118, typically from CAD data. Alternatively or additionally, the multiplicity of data points that are arranged on an inner contour of the spectacle frame 122 may be recorded by measuring, typically in an optical measuring laboratory, by means of an optical recording unit, typically scanned by means of a tracer or recorded by means of a scanner, in particular by means of an optical scanner. In FIG. 3B, the multiplicity of data points on the inner contour of the spectacle frame 122 are schematically shown in front of a grid 158, which reflects two coordinates of a coordinate system.

A lens design step 160, according to step (ii) of the computer-implemented method 125, involves creating a second data set stored on a storage medium, wherein the completed second data set comprises at least one respective geometric value in relation to the back surfaces 152, 152' and/or front surfaces 162, 162' of each lens 120, 120' facing away from the eye. Data values of the first data set are used to create the second data set, with one or usually a number of optimization steps 164 being carried out with regard to the at least one geometric value of the eye-side back surfaces 152, 152' of the two spectacle lenses 120, 120'.

Figure 4A:
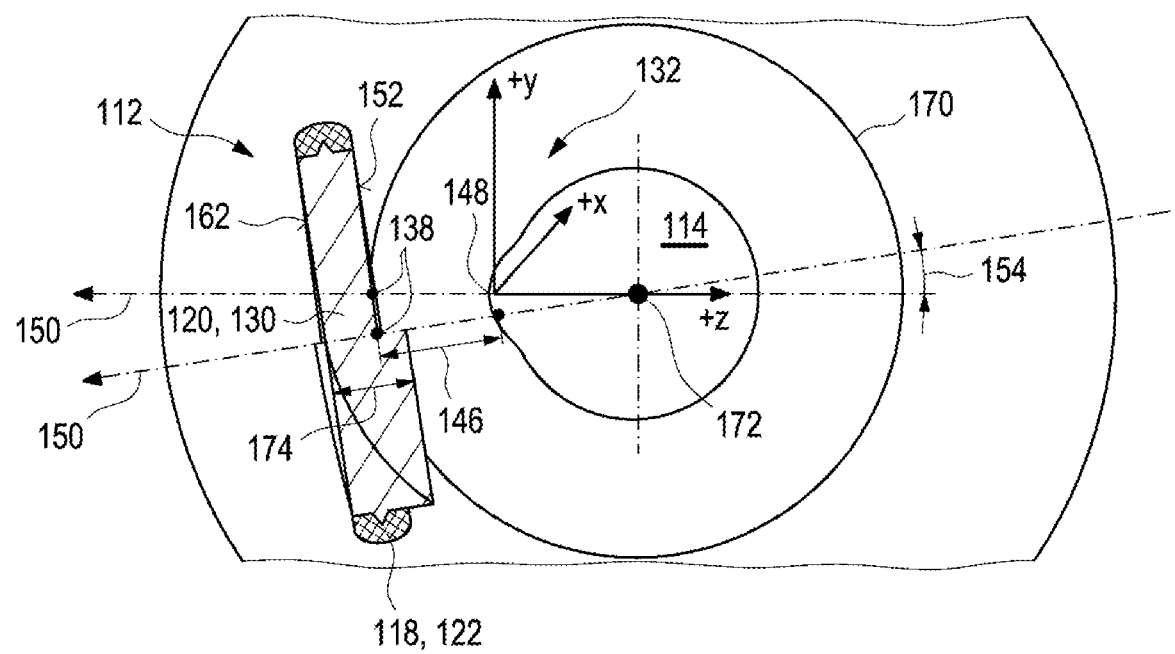
FIGS. 4A to 4C show a schematic representation of the geometric relationships when determining back surfaces on the eye side and front surfaces of a spectacle lens facing away from the eye (FIG. 4A), a desired distribution of an aberration (FIG. 4B) and a distribution of the aberration obtained after optimization (FIG. 4C)

As schematically shown in particular, in FIG. 4A, the spherical front surfaces 162, 162' of each spectacle lens 120, 120' facing away from the eye may first be determined according to optical and/or aesthetic aspects. As explained above, a radius of the spherical front surfaces 162, 162' of each spectacle lens 120, 120' may typically be selected from semi-finished products with spherical or aspherically rotationally symmetrical convex spherical front surfaces 162, 162' with few different radii. Already when selecting the front surfaces 162, 162', it may be advantageous to adapt the front surfaces 162, 162' to the frame shape of the frame edge curve 144 of the spectacle frame 118. A position of the front surfaces 162, 162' in front of the eyes 114, 114' may then be determined, while taking into account the frame shape and the three-dimensional course of the frame edge curve 144, with the common coordinate system 132 typically being able to be used here.

Figure 4B:
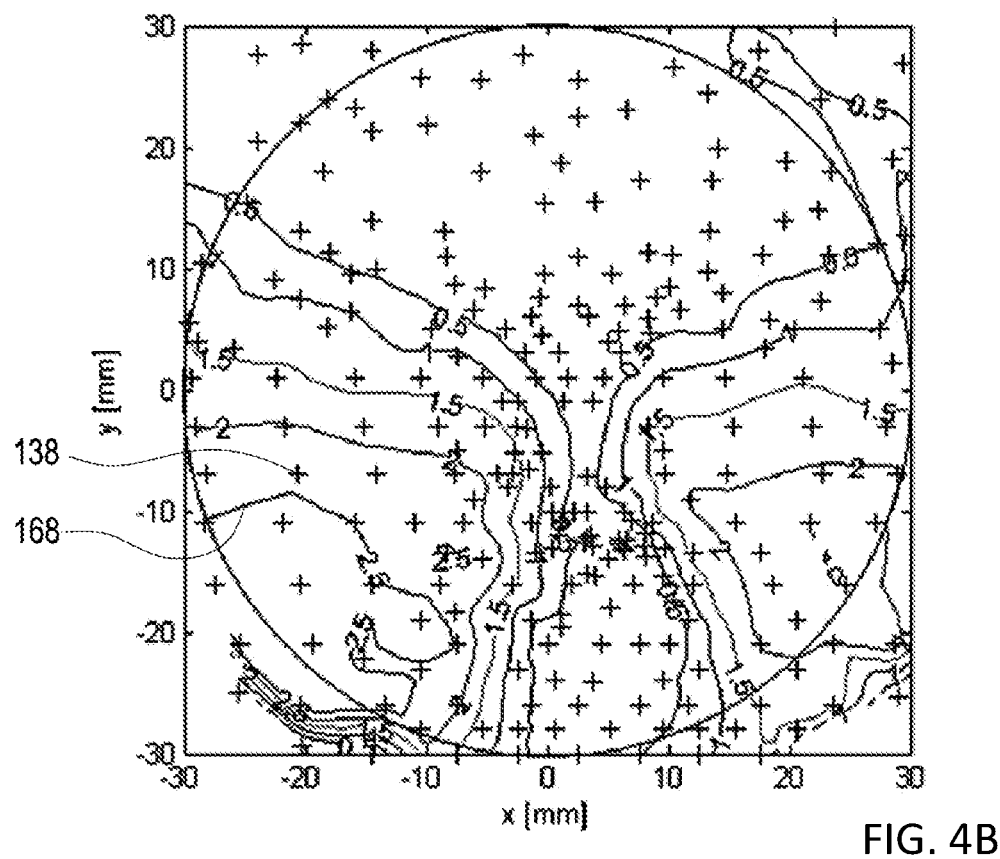
Figure 4C:
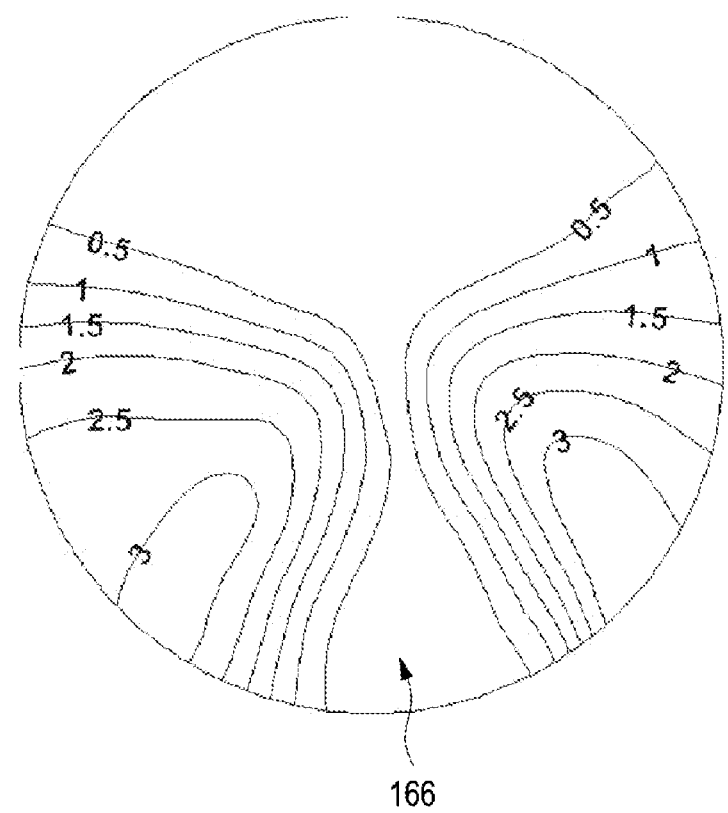

To determine the back surfaces 152, 152' of the spectacle lenses 120, 120' on the eye side, it may typically be assumed that the desired corrective effect 166 of the spectacle lenses 120, 120' in relation to the refractive errors of the eye 114, 114' of the user 116 is achievable at in each case at least one predetermined reference point on the front surfaces 162, 162' of the spectacle lenses 120, 120'. FIG. 4C schematically shows a distribution of an aberration obtained after optimization in the form of residual astigmatism for a selected spectacle lens 120, which is set up to correct an astigmatic refractive error in the eye 114 of the user 116. The distribution of the aberration obtained after the optimization, which the user 116 of the selected spectacle lens 120 perceives as blurring, should correspond as well as possible to a desired target distribution 168 schematically shown in FIG. 4B. The crosses shown in FIG. 4B each mark a visual point 138, 138' on the selected spectacle lens 120, at which an optical calculation of the aberration was performed. The isolines also shown in FIG. 4B were calculated on the basis of target values at a relatively small number of crosses, which explains the restless course of the isolines. In order to achieve the best possible adaptation to the desired target distribution 168, an iterative optimization in relation to the respective back surfaces 152, 152' may typically be carried out, starting from an initially determined starting surface. The effect of each spectacle lens 120, 120' optimized for the user 116 may be calculated at a multiplicity of visual points 138, 138' on the relevant spectacle lens 120, 120' in relation to a vertex sphere 170, which is shown in particular in FIG. 4B, and compared to a specified target value. A rotation of the respective eye 114, 114' around a predetermined eye rotation point 172 may typically be simulated, while taking into account the Listing's rule defined above.

During the iterative optimization of the eye-side back surfaces 152, 152' of the spectacle lenses 120, 120', in particular a change in a thickness 174 of the respective spectacle lens 120, 120' may take place, with the thickness 174 being determined by a distance between the respective front surface 162, 162' and the associated back surface 152, 152' of the relevant spectacle lens 120, 120'. As a result of the change in the thickness 174 of the respective spectacle lens 120, 120', the corneal vertex distance 146 in particular may change during the iterative optimization. It may therefore be advantageous to calculate the corrective effect 166 of the respective spectacle lens 120, 120' in the predetermined reference point in each iteration step and to convert it to the originally determined corneal vertex distance 146 in such a way that the corrective effect 166 of the respective spectacle lens 120, 120' thus calculated, shown by way of example in FIG. 4C, corresponds to the desired correction value for the respective spectacle lens 120, 120'.

After optimization has taken place, the data values of the eye-side back surfaces 152, 152' of the spectacle lenses 120, 120' are usually in their own coordinate system. However, the transformation of these data values from their own coordinate system to the common coordinate system 132 is known. After completion of the lens design step 160, a so-called "digital twin" of the spectacles 112 formed from the data values of the first data set and the second data set is consequently stored on a storage medium.

A determination step 175, according to step (iii) of the computer-implemented method 125, involves creating a third data set stored on a storage medium, the third data set being set up for producing the spectacle lenses 120, 120' from a spectacle lens blank 178 and/or for virtually representing the spectacle frame 118 or the spectacles 112 on an optical display device, in particular a monitor connected to a computer or a screen, e.g., a touch-sensitive screen (touch screen), of a mobile communication device, in particular a smartphone or tablet. As explained in more detail above, the third data set is created using the first data set created in the providing step 124 and the second data set created in the lens design step 160.

While carrying out a production step 176, in a fixing step 180 according to step a), for each spectacle lens 120, 120', the associated spectacle lens blank 178 can be inserted into a holding device (not shown), which is set up for fixing the spectacle lens blank 178, in particular by means of blocking the spectacle lens blank 178. For details regarding the blocking of the spectacle lens blank 178, reference is made to the above description.

Figure 5A:
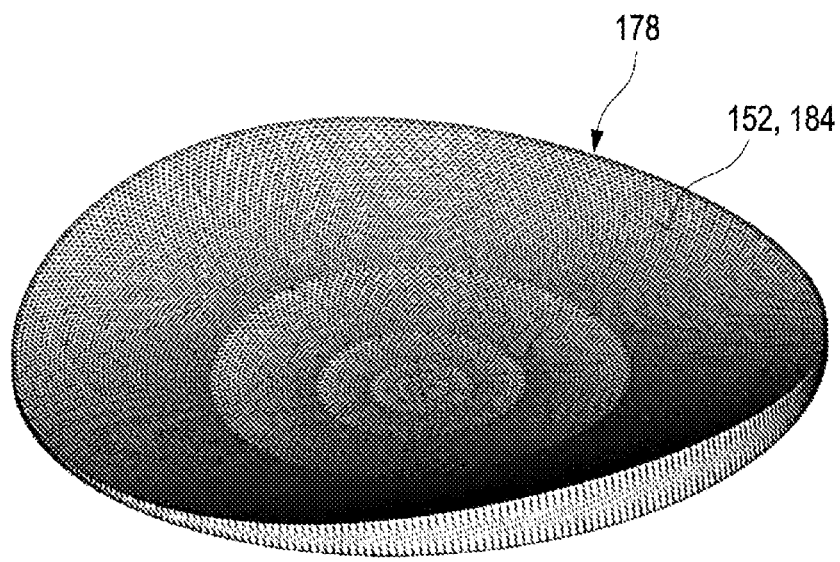
FIGS. 5A and 5B show a schematic representation of a spectacle lens blank for inserting into a first machining device (FIG. 5A) and a further marking introduced on the front surface of the spectacle lens (FIG. 5B)

In an exemplary embodiment, after the spectacle lens blank 178 has been fixed, as schematically shown in FIG. 5A, a first machining step 182 according to step c) involves machining the spectacle lens blank 178 in a first machining device (not shown) set up for this purpose, which is set up for creating the respective eye-side back surface 152, 152' of the spectacle lens 120, typically by removing material from the associated surface 184 of the spectacle lens blank 178, in particular by milling, turning, grinding, fine grinding and/or polishing of the relevant surface 184 of the spectacle lens blank 178. Semi-finished products which have a finished front surface 162, 162' may typically be used here. Typically, before carrying out the first machining step 182, those glass surfaces of the spectacle lens blank 178 that are not machined are provided with a protective device, in particular a film or a coating. In order to perform the machining of the spectacle lens blank 178 in the first machining step 182, in order in this way to obtain the desired back surface 152, 152' of the spectacle lens 120 according to the data values of the second data set, a coordinate transformation can take place from the common coordinate system 132 into an own coordinate system of the holding device and/or the first machining device.

Figure 6A:
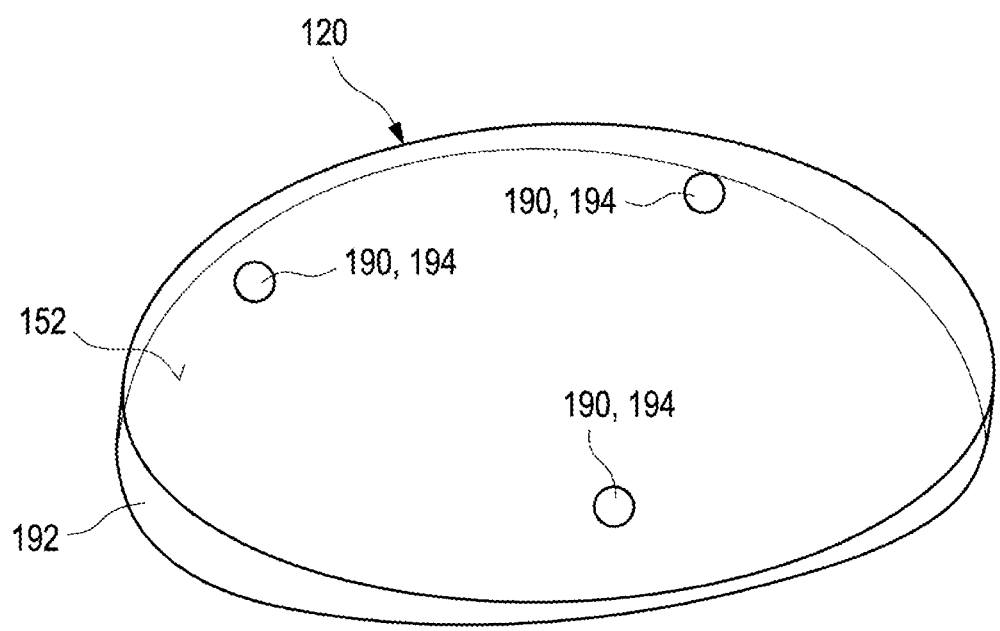
FIGS. 6A and 6B show a schematic representation of a marking on the back surface of the spectacle lens before insertion into a second machining device (FIG. 6A) and polishing of a fixed spectacle lens by means of a polishing device (FIG. 6B).

After the spectacle lens blank 178 has been machined during the first machining step 182, in a further fixing step 186 the spectacle lens 120, 120' can be inserted into a further holding device (not shown), which is set up for fixing the spectacle lens 120, 120'. As FIG. 6A schematically shows, a marking 190 may be applied to the back surface 152, 152' of the spectacle lens 120, 120' using the third data set, in particular before a second machining step 188, so that the machining of a lateral edge 192 of the spectacle lens 120, 120' can take place during the second machining step 188 using the marking 190, whereby a desired shape of the edge 192 of the spectacle lens 120, 120' can be obtained. As FIG. 6A shows, the marking 190 on the back surface 152, 152' of the spectacle lens 120, may typically take the form of reference marks, in particular in the form of at least three, typically exactly three, reference points 194, which lie on a sphere.

Figure 6B:
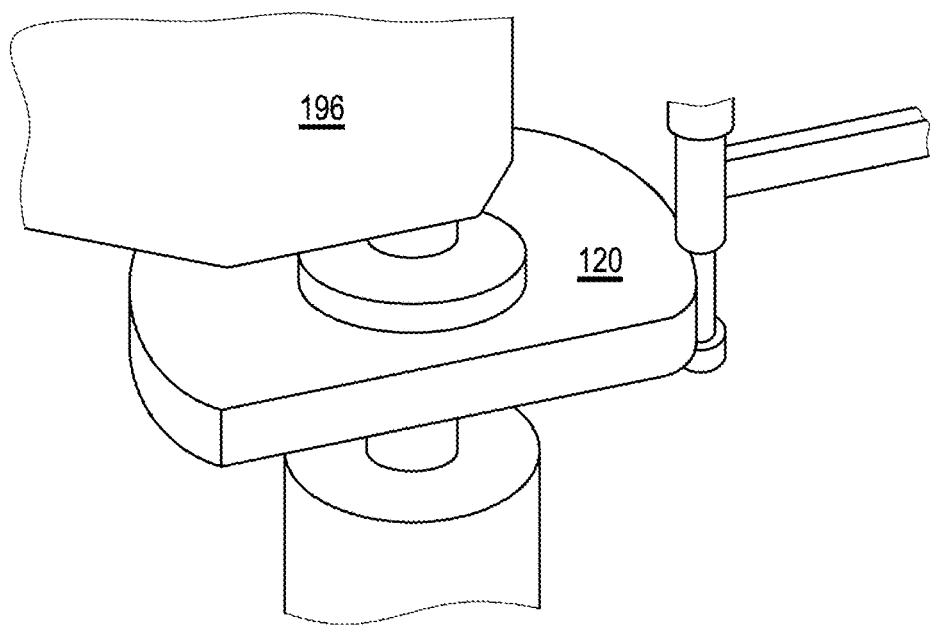

After the fixation of the spectacle lens 120, 120' has taken place in the further fixation step 186, the second machining step 188 can be carried out according to step b), which is set up for machining a lateral edge 192 of the spectacle lens 120, 120', typically by removing material from the edge 192 of the spectacle lens 120, 120', in particular by milling, turning, grinding, fine grinding and/or polishing. By way of example, polishing of the fixed spectacle lens 120 by means of a polishing device 196 is shown in FIG. 6B. In this case, the removal of material can be determined by transferring the data values from the at least one third data set, which, as mentioned above, is formed from the data values of the first data set and the second data set and which therefore includes both the data values in relation to the spectacle lens 120, 120' and in relation to the spectacle frame 118, by means of an interface to a second machining device (not shown). For further details on the second machining device and the associated interface, reference is made to the above description.

The fixing of the spectacle lens 120, 120' in the second holding device and the subsequent machining of the edge 192 of the spectacle lens 120, 120' in the second machining device take place in such a way that an edge shape of the spectacle lens 120, 120' also actually corresponds to the data values of the first data set. For this purpose, a precisely determined coordinate transformation from the common coordinate system 132 into a separate coordinate system of the second holding device and/or the second machining device may typically take place, as a result of which the actual position of the points in space affected thereby remains unchanged.

Figure 5B:
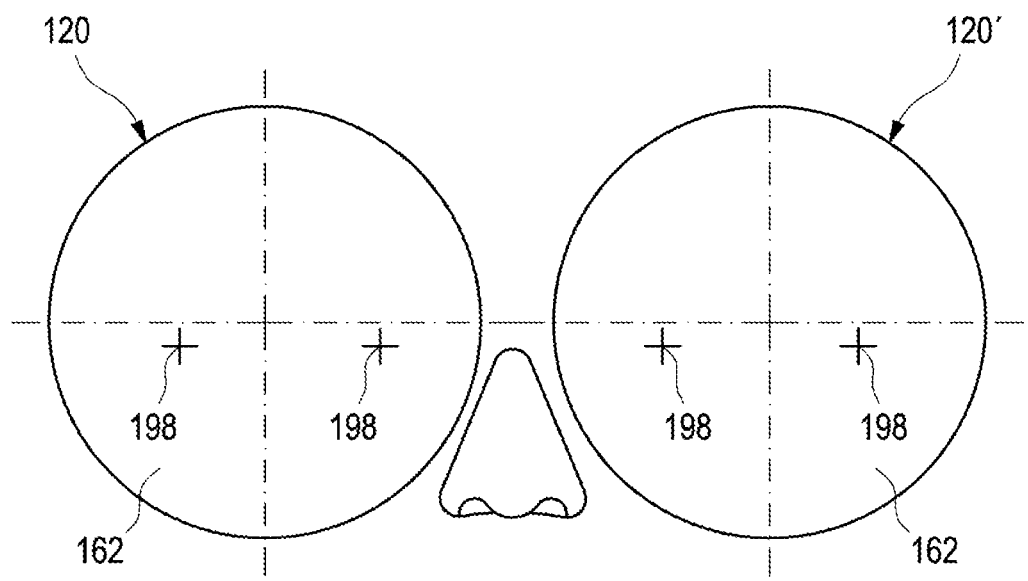

FIG. 5B shows that one or more further markings 198 may also be applied to the front surface 162, 162' of the spectacle lens 120, 120', for which a laser can typically be used, which can produce the desired one or more further markings 198 on the spectacle lens 120, 120' already fixed during the further fixing step 186. However, other ways of applying the one or more further markings 198 are conceivable.

In a further exemplary embodiment of production step 176 (not shown), the spectacle lens blank 178 may according to step a) be inserted into a single holding device (not shown), which can be set up for fixing the spectacle lens blank 178 both during the fixing step 180 and the further fixing step 186. According to step b), first the lateral edge 192 of the spectacle lens 120, 120' may be machined, typically by removing material from the edge 192 of the spectacle lens 120, 120', in particular by milling, turning, grinding, precision grinding and/or polishing, whereby the edge shape of the spectacle lens 120, 120' is determined. The spectacle lens blank 178 may subsequently remain in the single holding device, in order to machine at least one surface of the spectacle lens blank 178 there according to step c), in particular by milling, turning, grinding, fine grinding and/or polishing, in such a way that the desired back surface 152, 152 'of the spectacle lens 120, 120' is obtained according to the data values of the second data set, which has the desired corrective effect of the spectacle lens 120, 120'. For further details on this embodiment, reference is made to the above description. In addition, further typical embodiments of production step 176 are conceivable.

Finally, in a completion step 200, the finished spectacle lenses 120, 120' are fitted into the spectacle frame 118, as a result of which the desired pair of spectacles 112 is obtained. Due to the fact that in the present computer-implemented method 125 the data values of each data set can in each case be specified in relation to an own coordinate system, but in this case all data values of each data set are specified in the coordinate system 132 common to all data sets or can be transformed from the common coordinate system 132 or into the common coordinate system 132, any deviations, errors and/or tolerances that may occur can no longer add up. The finished spectacles 112 thus correspond exactly to the requirements of the user 116, in that the spectacle frame 118 is precisely adapted to the head of the user 116 and the spectacle lenses 120, 120' correctly correct the refractive error of the user 116 without the user 116 experiencing intolerance. As a result, the user 116 likes to wear the custom-made spectacles 112 and therefore has no reason to make any complaints in relation to the custom-made spectacles 112, in particular to the optician.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

110 Method for producing a pair of spectacles
112 Spectacles
114, 114' Eye
116 User
118 Spectacle frame
120, 120' Spectacle lens
122 Spectacle frame
124 Providing step
125 Computer-implemented method
126 Centering value
128 (Three-dimensional) model
130, 130' Dummy lens
132 Common coordinate system
134, 134' Interpupillary distance
136, 136' Eye point
138, 138' Visual point
140 Straight line
142, 142' Lowest point
144 Frame edge curve
146, 146' First corneal vertex distance
148, 148' Corneal vertex
150, 150' Line of sight
152, 152' Eye-side back surface
154 First angle (pre-tilt angle)
156, 156' Second angle
158 Grid
160 Lens design step
162 Front surface
164 Optimization step
166 Corrective effect
168 Target distribution
170 Vertex sphere
172 Eye rotation point
174 Thickness
175 Determination step
176 Production step
178 Spectacle lens blank
180 Fixation step
182 Machining step
184 Surface (of the spectacle lens blank)
186 Further fixation step
188 Further machining step
190 Marking
192 Edge (of the spectacle lens)
194 Reference point
196 Polishing device
198 Further marking
200 Completion step

The invention claimed is:

1. A computer-implemented method for generating data for the production of at least one spectacle lens adapted to a spectacle frame of a pair of spectacles, the computer-implemented method comprising the following steps:
(i) providing at least one first data set stored on a storage medium, the first data set including at least the following data values:
at least one centering value; and
a three-dimensional model of the spectacle frame;
(ii) creating at least one second data set stored on the storage medium using the at least one first data set, the second data set comprising at least the following data values:
at least one geometric value of at least one surface of the at least one spectacle lens,
wherein the method further comprises the following step:
(iii) creating at least one third data set stored on a storage medium for producing the at least one spectacle lens from at least one spectacle lens blank and for grinding and/or fitting the at least one spectacle lens into the spectacle frame using the at least one first data set and the at least one second data set, wherein the at least one third data set is a production data set, each data value of the at least one third data set including at least one piece of information relating to the production of the at least one spectacle lens or to grinding and/or fitting the at least one spectacle lens into the spectacle frame, wherein the information is used in a method for producing at least one pair of spectacles, and wherein the data values of each data set have a spatial relationship with one another in that the data values of each data set are consistently specified in relation to a respective coordinate system, with all data values of each data set being specified in a coordinate system common to all data sets.

2. The computer-implemented method according to claim 1, wherein the common coordinate system is selected from a coordinate system which relates to a position of the at least one pupil of the at least one eye of the user and the line of sight extending therefrom of the at least one eye of the user through the at least one spectacle lens.

3. The computer-implemented method according to claim 2, wherein an own coordinate system, which relates to a position of the respective pupil of the relevant eye of the user and the line of sight extending therefrom of the relevant eye of the user through the associated spectacle lens, is chosen for each of the two eyes of the user.

4. The computer-implemented method according to claim 2, wherein the own coordinate system for each of the two eyes has
a first axis parallel to a line of sight of the eye of the user;
a second axis perpendicular to the first axis parallel to a direction of gravity; and
a third axis perpendicular to both the first axis and the second axis.

5. The computer-implemented method according to claim 1, wherein the at least one centering value is determined by creating a centering record with the spectacle frame worn by the user while the user adopts a habitual head and body posture and a fixed line of sight through at least one dummy lens fitted into the spectacle frame.

6. The computer-implemented method according to claim 1, wherein the at least one centering value comprises at least one of the following data values:
   at least one distance from a corneal vertex of at least one eye of the user to a visual point of at least one line of sight through at least one surface of the spectacle lens;
   at least one distance from the visual point to a straight line through at least one lowest point of a frame edge curve of the spectacle frame or an edge curve of the at least one spectacle lens; and
   at least one horizontal distance between an identical position on each of the two spectacle lenses.

7. The computer-implemented method according to claim 6, wherein the three-dimensional model of the spectacle frame comprises a multiplicity of data points relating to the frame edge curve of the spectacle frame.

8. The computer-implemented method according to claim 7, wherein the multiplicity of data points are recorded by measuring using the spectacle frame or are selected from provided spatial design data of the spectacle frame.

9. The computer-implemented method according to claim 1, wherein the geometric data values relate to a spatial shape of the spectacle lens, wherein the three-dimensional shape of the spectacle lens comprises a spherical or aspherically rotationally symmetrical convex front surface and a back surface of the spectacle lens configured to correct at least one refractive error of at least one eye of the user.

10. The computer-implemented method according to claim 9, wherein, starting from a determined starting surface, at least one optimization step for determining the back surface for the user is performed, and wherein the at least one centering value from the at least one first data set is used as a boundary condition for the at least one optimization step.

11. The computer-implemented method according to claim 10, wherein the at least one second data set comprises at least one further data value that specifies a lens selection for the at least one spectacle lens.

12. A computer program for carrying out a computer-implemented method as claimed in claim 1.

13. A method for producing a pair of spectacles, the method comprising the following steps:
   (I) generating data for the production of at least one spectacle lens adapted to a spectacle frame of a pair of spectacles according to the computer-implemented method according to claim 1;
   (II) producing the at least one spectacle lens from at least one spectacle lens blank and grinding and/or fitting the at least one spectacle lens into the spectacle frame using the third data set of the data generated according to step (I).

14. The method according to claim 13, wherein the production of the at least one spectacle lens from the at least one spectacle lens blank comprises the following steps:
   a) inserting a spectacle lens blank into a holding device for fixing the spectacle lens blank;
   b) machining a lateral edge of the spectacle lens blank, wherein an edge shape of the spectacle lens is determined;
   c) machining at least one surface of the spectacle lens blank, wherein a corrective effect of the spectacle lens is obtained;
   wherein steps a) to c) are each performed using the at least one third data set.

15. The method according to claim 14, wherein before step b) at least one marking is applied to the back surface of the spectacle lens using the at least one third data set, step b) is being carried out using the at least one marking on the back surface of the spectacle lens.

16. The method according to claim 15, wherein before step b) at least one further marking is applied to the front surface of the spectacle lens using the at least one third data set.

17. A system for producing at least one spectacle lens adapted to a spectacle frame of a pair of spectacles, the system comprising:
   at least one first device, which is set up for determining at least one centering value;
   at least one second device, which is set up for determining a three-dimensional model of the spectacle frame;
   at least one third device, which is set up for determining at least one geometric value of at least one surface of the at least one spectacle lens;
   at least one first evaluation unit including:
      at least one first input interface, which is set up for receiving the at least one centering value and the three-dimensional model of the spectacle frame;
      at least one first calculation unit, which is set up for ascertaining at least one first data set, the first data set comprising at least the following data values: at least one centering value; a three-dimensional model of the spectacle frame;
      at least one first output interface, which is set up for providing the at least one first data set;
   at least one second evaluation unit including:
      at least one second interface, which is set up for receiving the at least one first data set and the at least one geometric value of the at least one surface of the at least one spectacle lens;
      at least one second calculation unit, which is set up for ascertaining at least one second data set using the at least one first data set, the second data set comprising at least the following data values: at least one geometric value of at least one surface of the at least one spectacle lens;
      at least one second output interface, which is set up for providing the at least one second data set;
   wherein the system further comprises:
   at least one third evaluation unit including:
      at least one third input interface, which is set up for receiving the at least one first data set and the at least one second data set;
      at least one third calculation unit, which is set up for ascertaining at least one third data set for producing the at least one spectacle lens from at least one spectacle lens blank and for grinding and/or fitting the at least one spectacle lens into the spectacle frame using the at least one first data set and the at least one second data set;
      at least one third output interface, which is set up for providing the at least one third data set;
   at least one control unit, comprising:
      at least one fourth interface, which is set up for receiving the at least one third data set;
      at least one production unit, which is set up for producing the at least one spectacle lens from the at least one spectacle lens blank and for grinding and/or fitting the at least one spectacle lens into the spectacle frame using the at least one third data set, wherein the data values of each data set have a spatial relationship with one another in that the data values of each data set are consistently specified in relation to a respective coordinate system, the spatial relationship being achieved in that each calculation unit is set up to specify the data values of each data set in a coordinate system common to all data sets.

18. The system according to claim 17, wherein the at least one first evaluation unit also comprises a first storage medium, which is set up for storing the at least one first data set.

19. The system according to claim 17, wherein the at least one second evaluation unit also comprises a second storage medium, which is set up for storing the at least one second data set.

20. The system according to claim 17, wherein the at least one third evaluation unit also comprises a third storage medium, which is set up for storing the at least one third data set.

\* \* \* \* \*